United States Patent
Kim et al.

(10) Patent No.: US 10,698,590 B2
(45) Date of Patent: Jun. 30, 2020

(54) METHOD FOR PROVIDING CONTENT AND ELECTRONIC DEVICE THEREFOR

(71) Applicant: SAMSUNG ELECTRONICS CO., LTD., Suwon-si, Gyeonggi-do (KR)

(72) Inventors: Hark-Joon Kim, Ansan-si (KR); Taeyeon Won, Yongin-si (KR); Dongjin Lee, Seoul (KR); Youn Ju Jin, Yongin-si (KR); Jinah Kong, Seoul (KR); Yangjic Lee, Gwacheon-si (KR); Hanui Yun, Seoul (KR); Saerom Hwang, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/343,519

(22) PCT Filed: Oct. 16, 2017

(86) PCT No.: PCT/KR2017/011364
§ 371 (c)(1),
(2) Date: Apr. 19, 2019

(87) PCT Pub. No.: WO2018/074787
PCT Pub. Date: Apr. 26, 2018

(65) Prior Publication Data
US 2019/0265873 A1    Aug. 29, 2019

(30) Foreign Application Priority Data

Oct. 20, 2016 (KR) .................. 10-2016-0136518

(51) Int. Cl.
*G06F 3/0484* (2013.01)
*G06F 3/0482* (2013.01)
(Continued)

(52) U.S. Cl.
CPC ........ *G06F 3/04845* (2013.01); *G06F 3/0482* (2013.01); *G06Q 30/0276* (2013.01);
(Continued)

(58) Field of Classification Search
CPC .............. G06F 3/04845; G06F 3/0482; G06Q 30/0276
See application file for complete search history.

(56) References Cited

U.S. PATENT DOCUMENTS

2013/0124676 A1* 5/2013 Mochizuki ....... H04N 21/41407
                                                     709/217
2013/0201104 A1* 8/2013 Ptucha .................... G06F 3/017
                                                     345/158
(Continued)

FOREIGN PATENT DOCUMENTS

JP       2015-007928        1/2015
KR       10-2013-0126207    11/2013
(Continued)

OTHER PUBLICATIONS

International Search Report for PCT/KR2017/011364 with English translation, dated Jan. 24, 2018, 5 pages.
(Continued)

*Primary Examiner* — Anil K Bhargava
(74) *Attorney, Agent, or Firm* — Nixon & Vanderhye, P.C.

(57) ABSTRACT

Various embodiments of the present invention relate to a device and a method for setting an area for an interaction of reactive content in an electronic device, wherein an electronic device operating method can comprise the steps of: displaying an image acquired from an external electronic device electrically connected to the electronic device; correcting the image into a top view form; displaying a guide interface of a lattice pattern form such that the image
(Continued)

corrected into a top view form is overlapped therewith; selecting at least a partial area of the guide interface; applying spatial coordinates for the at least partial area so as to set an area for an interaction in a sensor of the external electronic device; copying the selected at least partial area and attaching the same to an adjacent other area; and mapping content to the area for an interaction. Other embodiments are possible.

20 Claims, 28 Drawing Sheets

(51) Int. Cl.
  *G06Q 30/02* (2012.01)
  *H04N 21/414* (2011.01)
  *H04N 21/458* (2011.01)
  *H04N 21/4728* (2011.01)
  *H04N 21/472* (2011.01)

(52) U.S. Cl.
  CPC ......... *H04N 21/414* (2013.01); *H04N 21/458* (2013.01); *H04N 21/472* (2013.01); *H04N 21/4728* (2013.01)

(56) References Cited

U.S. PATENT DOCUMENTS

| | | |
|---|---|---|
| 2015/0006281 A1 | 1/2015 | Takahashi |
| 2015/0082193 A1* | 3/2015 | Wallace ............. G06Q 30/0251 715/752 |
| 2015/0358410 A1* | 12/2015 | Chandrasekaran ..... H04W 4/70 709/227 |
| 2016/0249039 A1 | 8/2016 | Tran et al. |
| 2017/0039416 A1* | 2/2017 | Antipa ................. G06K 9/6202 |
| 2017/0213389 A1* | 7/2017 | Han ................... H04N 5/44591 |
| 2017/0278139 A1* | 9/2017 | Vaya ....................... H04W 4/80 |
| 2018/0033050 A1* | 2/2018 | Jung ................. G06Q 30/0267 |

FOREIGN PATENT DOCUMENTS

| | | |
|---|---|---|
| KR | 10-2015-0058699 | 5/2015 |
| KR | 10-2016-0107609 | 9/2016 |

OTHER PUBLICATIONS

Written Opinion of the ISA for PCT/KR2017/011364, dated Jan. 24, 2018, 4 pages.

Kang, Hyunock, "Movement and Interaction Design for Digital Signage", Journal of Digital Design, vol. 13, No. 2, pp. 345-354, Apr. 2013, pp. 349-352.

* cited by examiner

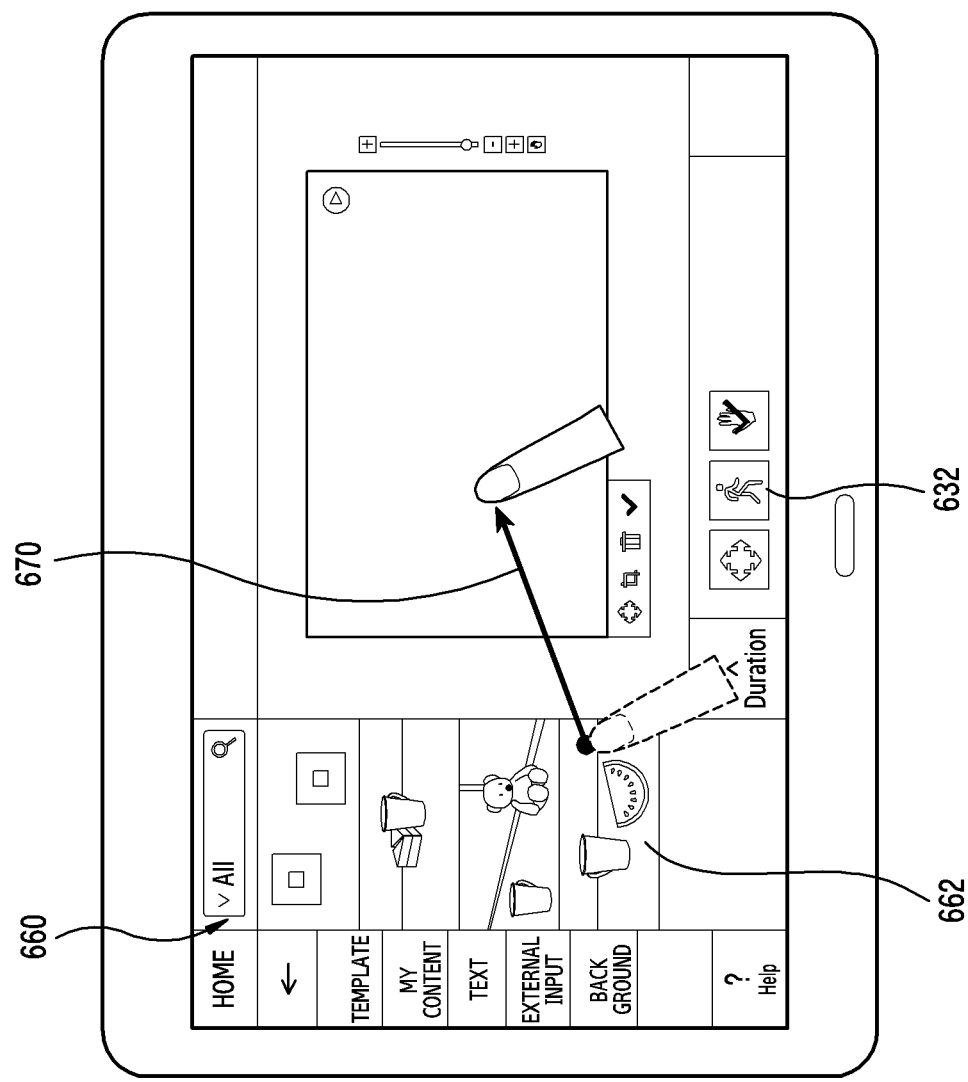

METHOD FOR PROVIDING CONTENT AND ELECTRONIC DEVICE THEREFOR

This application is the U.S. national phase of International Application No. PCT/KR2017/011364 filed 16 Oct. 2017, which designated the U.S. and claims priority to KR Patent Application No. 10-2016-0136518 filed 20 Oct. 2016, the entire contents of each of which are hereby incorporated by reference.

TECHNICAL FIELD

Various embodiments of the present invention relate to an apparatus and a method for providing reactive content in an electronic device.

BACKGROUND ART

Various types of electronic products are developed and supplied with development of information communication technology and electronic technology, and electronic devices having various information providing functions are being used. Moreover, an electronic device is installed and used not only indoors but also outdoors such as on a street and in a store. For example, a digital signage device is a digital information display for outdoor advertising, and is installed on not only the street and the store but also an outer wall of a building to provide content (e.g., advertisement content).

A digital signage device may provide active content corresponding to context awareness information such as the number of users, gesture, voice, sound direction, and the like, acquired using a sensor. Hence, the digital signage device may be subject to creating and managing content corresponding to surrounding environment information where the digital signage device is installed. For example, if a specific business advertises a product through a digital signage device, it may need to create and manage content of the digital signage device installed in each store to correspond to a surrounding environment of the store where the digital signage device is installed.

Various embodiments of the present invention may provide an apparatus and a method for generating reactive content in an electronic device.

Various embodiments of the present invention may provide an apparatus and a method for setting an area (e.g., a three-dimensional area) for conducting an interaction through reactive content in an electronic device.

According to various embodiments of the present invention, an electronic device includes a communication interface, a display, and at least one processor, and the at least one processor may be configured to control the display to display an image received from an external electronic device through the communication interface, correct the image into a top view form, control the display to display a guide interface of a lattice pattern form to overlap the image which is corrected into the top view form, select at least partial area of the guide interface, set an area for an interaction of a sensor of the external electronic device by applying spatial coordinates for the at least partial area, and map content to the area for the interaction.

According to various embodiments of the present invention, an operating method of an electronic device may include displaying an image obtained from an external electronic device, correcting the image into a top view form, displaying a guide interface of a lattice pattern form to overlap the image which is corrected into the top view form, selecting at least partial area of the guide interface, setting an area for an interaction of a sensor of the external electronic device by applying spatial coordinates for the at least partial area, and mapping content to the area for the interaction.

An electronic device and its operating method according to various embodiments may separate the area setting for creating the reactive content and conducting the interaction through the reactive content, and thus easily create or edit the content corresponding to the digital signage device installed in each store.

An electronic device and its operating method according to various embodiments may set the area for conducting the interaction on the cell basis of the lattice in the three-dimensional image corrected to the top view, and thus easily set and change the area for the interaction corresponding to the reactive content.

BRIEF DESCRIPTION OF DRAWINGS

FIGS. 6A to 6C illustrate a screen configuration for configuring reactive content according to various embodiments of the present invention.

DETAILED DESCRIPTION OF EXAMPLE EMBODIMENTS

Figure 1A:
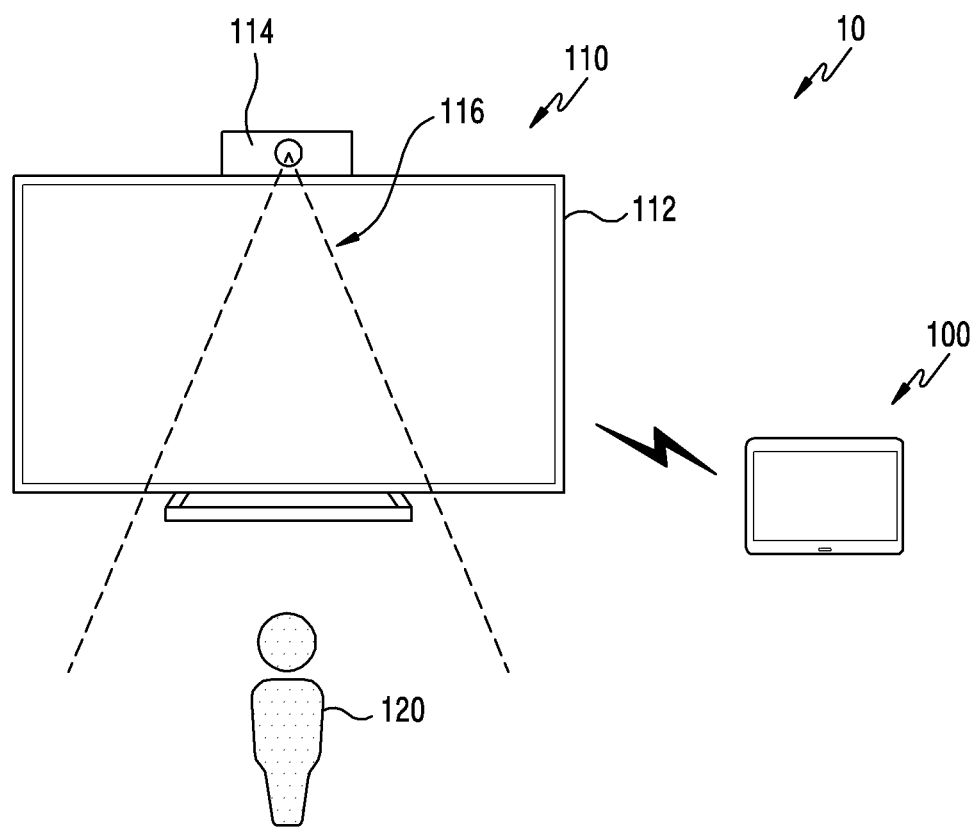
FIG. 1A illustrates a configuration of a system for providing an advertising service according to various embodiments of the present invention.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context.

In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit).

According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

Figure 1B:
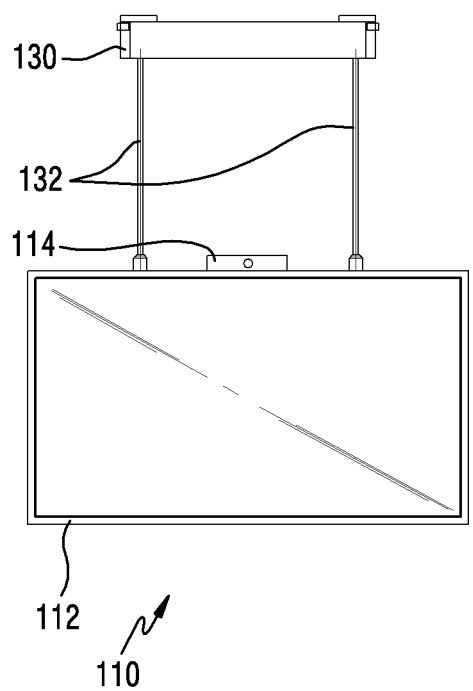
FIGS. 1B to 1C illustrate an exterior configuration of a digital signage device according to various embodiments of the present invention.
Figure 1C:
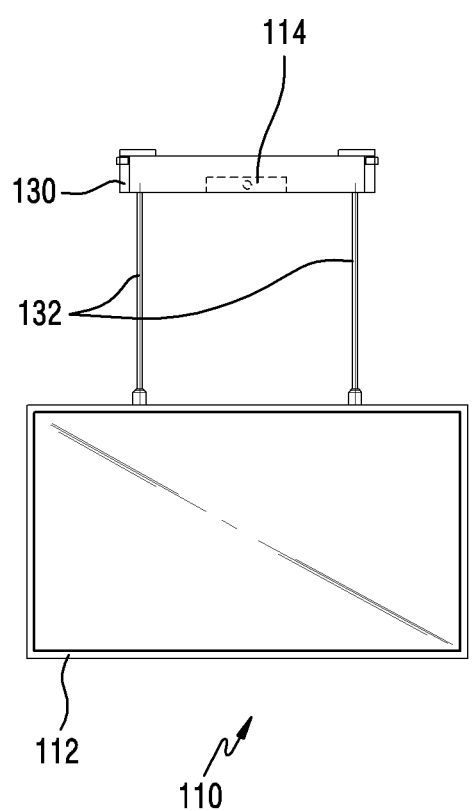

FIG. 1A illustrates a configuration of a system for providing an advertising service according to various embodiments of the present invention. FIGS. 1B through 1C illustrate an exterior configuration of a digital signage device according to various embodiments of the present invention.

Referring to FIG. 1A, a system 10 for providing the advertising service may include an electronic device 100 and an external electronic device 110.

According to an embodiment, the electronic device 100 may generate and manage content to be provided from the external electronic device 110. For example, the electronic device 100 may configure at least one reactive content including an interaction list. The electronic device 100 may set at least one interaction to be provided from the external electronic device 110 and an interaction area through the reactive content based on characteristics of the external electronic device 110. For example, the characteristics of the external electronic device 110 may include at least one of hardware specifications of the external electronic device 110, characteristics (e.g., age, gender, etc.) of a customer to whom the content is provided through the external electronic device 110, and surrounding environment information for installing the external electronic device 110.

According to an embodiment, the electronic device 100 may schedule driving of the external electronic device 110. For example, if the electronic device 100 provides a plurality of contents through the external electronic device 110, it may schedule a playback time of each content.

According to an embodiment, the electronic device 100 may transmit the content and schedule information to the external electronic device 110. For example, the electronic device 100 may transmit the content and the schedule information to the external electronic device 110 through wireless communication or wired communication. For example, the wireless communication may include cellular communication or short-distance communication.

According to an embodiment, the external electronic device 110 may play the content based on the schedule information provided from the electronic device 100. For example, the external electronic device 110 may include a digital signage device. For example, if the external electronic device 110 plays the content provided from the electronic device 100, it may actively provide various services (e.g., additional content) to correspond to context awareness information obtained through a sensor 114. For example, if a user 120 enters a sensing range 116 of the sensor 114, the external electronic device 110 may display predefined additional content (e.g., product advertisement) through a display 112. For example, if detecting a user input (e.g., touch) to the content information (e.g., advertisement) displayed on the display 112, the external electronic device 110 may output promotion information which may arouse interest of the user 120 for the corresponding content. For example, if detecting contact of the user 120 with a product displayed in the sensing range 116 of the external electronic device 110 through the sensor 114, the external electronic device 110 may display detailed information of the corresponding product on the display 112. For example, if detecting a user input (e.g., touch) for a specific product in the content information (e.g., advertisement) displayed on the display 112, the external electronic device 110 may display detailed information of the corresponding product on the display 112. For example, the sensor 104 may include an image sensor for acquiring a three-dimensional image.

According to an embodiment, the external electronic device 110 may be installed on a rail 130 installed on a building, as shown in FIG. 1B or 1C. For example, the external electronic device 110 may be connected to the rail 130 installed on the building through a connecting line 132 connected to the display device 112, as shown in FIG. 1B and FIG. 1C. For example, the connecting line 132 may include at least one of a power line for supplying power from the rain 130 to the external electronic device 110 and a communication line. For example, the external electronic device 110 may dispose the sensor 114 for detecting the context awareness information in the external electronic device 110 in at least partial area of the display 112, as shown in FIG. 1B. For example, the external electronic device 110 may dispose the sensor 114 for detecting the context awareness information in the external electronic device 110 in at least partial area of the rain 130, as shown in FIG. 1C. For example, the rail 140 is disposed to install lighting of the building, and may include the power line for supplying the power to an external device connected to the rail 140.

According to an embodiment, the external electronic device 110 may include a plurality of displays. For example, if the external electronic device 110 includes the plurality of the displays, it may display information of different contents through the respective displays. For example, if including the plurality of the displays, the external electronic device 110 may display information of one content using the multiple displays.

Figure 2:
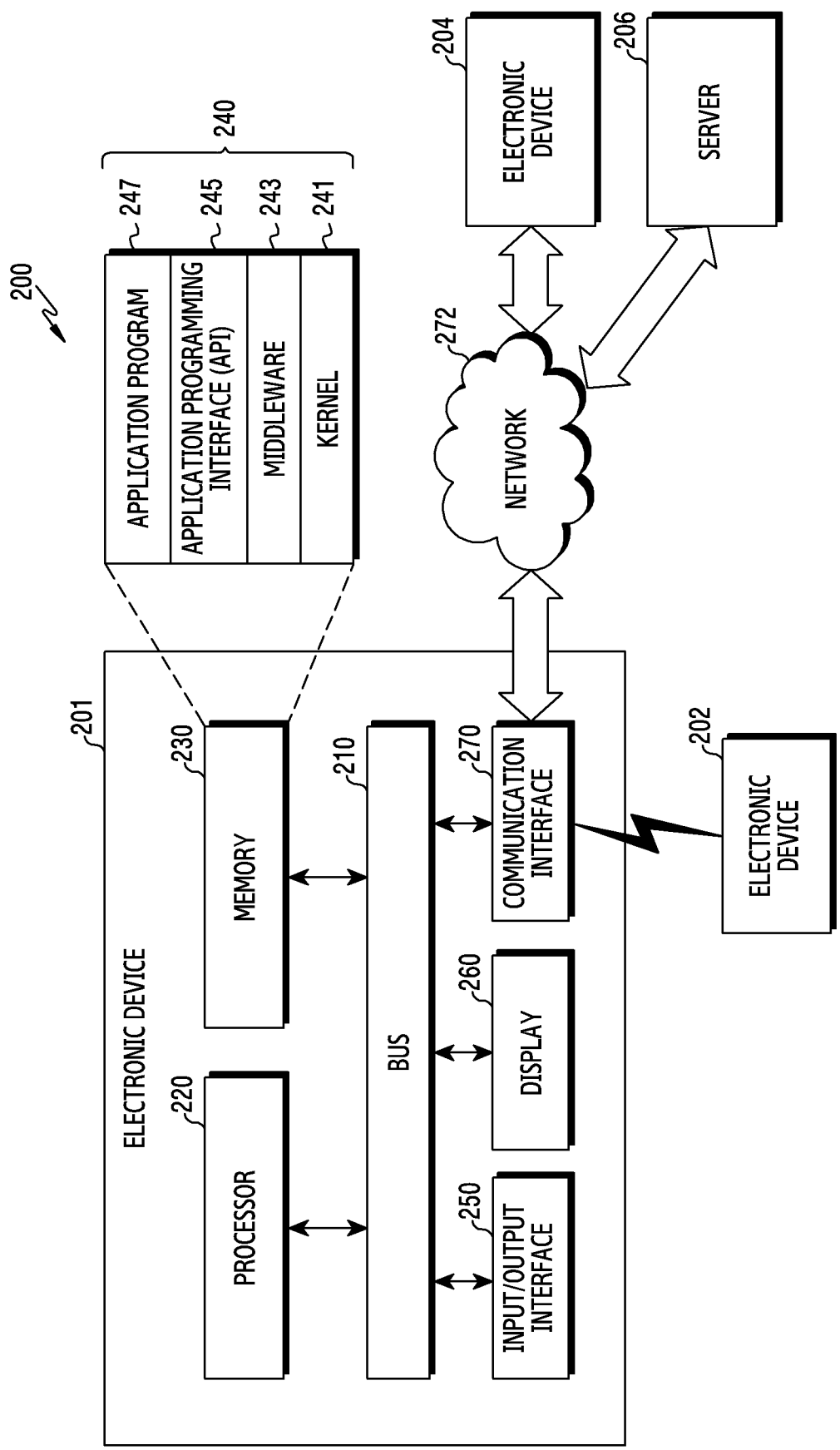
FIG. 2 illustrates an electronic device of a network environment in various embodiments of the present invention.

FIG. 2 illustrates an electronic device 201 of a network environment 200 in various embodiments of the present invention. In the following explanations, the electronic device 201 may include the electronic device 100 of FIG. 1A.

Referring to FIG. 2, the electronic device 201 may include a bus 210, a processor 220, a memory 230, an input/output interface 250, a display 260 and a communication interface 270. In some embodiments, the electronic device 201 may omit at least one of the components, or may additionally include other elements. For example, a haptic providing module 290 may be omitted.

The bus 210 may include a circuit for interconnecting, for example, the components 220 through 270 and delivering communication (e.g., control messages and/or data) between the components.

The processor 220 may include one or more of a central processing unit (CPU), an application processor (AP), an image signal processor (ISP) or a communication processor (CP). The processor 120, for example, may execute operation or data processing regarding control and/or communication of at least other components of the electronic device 201.

According to an embodiment, the processor 220 may generate content to be provided to the external electronic device 202 or 204. For example, the processor 220 may configure reactive content including at least one interaction provided from the external electronic device 202 or 204 and additional content corresponding to each interaction. Additionally or alternatively, the processor 220 may schedule a time for playing the reactive content at the external electronic device 202 or 204. The processor 220 may control the communication interface 270 to transmit the reactive content and scheduling information to the external electronic device 202 or 204.

According to an embodiment, the processor 220 may set an area for performing the interaction through the reactive content at the external electronic device 202 or 204. For example, the processor 220 may obtain an image captured through a sensor (e.g., an image sensor) of the external electronic device 202 or 204. The processor 220 may control the display 260 to top view correct the image provided from the external electronic device 202 or 204 and to overlap and display a guide interface for setting the area with the image. For example, the guide interface for setting the area may be configured in the form of a lattice pattern. The processor 220 may set a reference area based on a user input for the guide interface. The processor 220 may set an area for the interaction by calculating spatial coordinates (three-dimensional spatial coordinates) for the reference area which is set through the guide interface. The processor 220 may map the interaction and the additional connect to the area for the interaction. Additionally or alternatively, based on a user input for a preset area (or a reference area) for the interaction, the processor 220 may set an area for an additional interaction by copying a corresponding area. In this case, the area for the additional interaction may be mapped with the same interaction and additional content as the original area.

According to an embodiment, the processor 220 may provide statistics information of the reactive content. For example, the processor 220 may provide the statistics information of each interaction included in the reactive content by collecting driving information of the reactive content provided from the external electronic device 202 or 204. Specifically, the processor 220 may set a target value on at least one interaction included in the reactive content. The processor 220 may provide achievement information for the target value of the corresponding interaction by collecting the driving information of the reactive content provided from the external electronic device 202 or 204. Additionally or alternatively, the processor 220 may generate content to be provided through the external electronic device 202 or 204 using the statistics information of the interaction.

The memory 230 may include a volatile and/or nonvolatile memory. The memory 230, for example, may store commands or data relating to at least other component of the electronic device 201. According to an embodiment, the memory 230 may store software and/or a program 240. For example, the program 240 may include a kernel 241, middleware 243, an application programming interface (API) 245, or an application program (or "application") 247. At least part of the kernel 241, the middleware 243, or the API 245 may be referred to as an operating system (OS).

The kernel 241 may control or manage system resources (e.g., the bus 210, the processor 220, or the memory 230) used for performing operations or functions implemented by, for example, other programs (e.g., the middleware 243, the API 245, or the application program 247). In addition, the kernel 241 may provide an interface for controlling or managing the system resources, by accessing the individual component of the electronic device 201 from the middleware 243, the API 245, or the application program 247.

The middleware 243, for example, may serve an intermediary role so that the API 245 or the application program 247 exchanges data by communicating with the kernel 241. In addition, the middleware 243 may process one or more task requests received from the application program 247, based on their priority. For example, the middleware 243 may assign a priority for using the system resource (e.g., the bus 210, the processor 220, or the memory 230) of the electronic device 201 to at least one of the application programs 247, and process the one or more task requests. The API 245 is an interface through which the application program 247 controls a function provided from the kernel 241 or the middleware 243, and may include, for example, at least one interface or function (e.g., an instruction) for file control, window control, image processing, or character control.

The input/output interface 250 may serve an interface role for delivering commands or data inputted from the user or another external device to other component(s) of the electronic device 201.

The display 260, for example, may include a liquid crystal display (LCD), a light emitting diode (LED) display, an organic light emitting diode (OLED) display, a micro electro mechanical systems (MEMS) display, or an electronic paper display. The display 260, for example, may display various contents (e.g., texts, images, videos, icons, and/or symbols) to the user. The display 260 may include a touch screen, for example, and receive touch, gesture, proximity, or hovering inputs by using an electronic pen or a user's body part.

The communication interface 270, for example, may establish communication between the electronic device 201 and an external device (e.g., a first external electronic device 202, a second external electronic device 204, or a server 206). For example, the communication interface 270 may communicate with the external device (e.g., the second external electronic device 204 or the server 206) over a network 262 using wireless communication or wired communication.

The wireless communication, for example, may include cellular communication using at least one of long term evolution (LTE), LTE-Advanced (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication may include, for example, at least one of Wireless Fidelity (WiFi), Bluetooth (BT), BT low energy (BLE), Zigbee, near field communication (NFC), magnetic secure transmission (MST), radio frequency (RF), or a body area network (BAN). According to an embodiment, the wireless communication may include GNSS. The GNSS may be, for example, global positioning system (GPS), global navigation satellite system (GLONASS), Beidou navigation satellite system (Beidou), or Galileo (the European global satellite-based navigation system). Hereafter, the "GPS" may be interchangeably used with the "GNSS" in this document. The wired communication, for example, may include at least one of universal serial bus (USB), high definition multimedia interface (HDMI), recommended standard 232 (RS-232), power line communication, or plain old telephone service (POTS). The network 262 may include a telecommunications network, for example, at least one of a computer network (e.g., local area network (LAN) or wide area network (WAN)), Internet, or a telephone network.

Each of the first and second external electronic devices 202 and 204 may be of the same as or a different type from the type of the electronic device 201. For example, at least one external electronic device of the first external electronic device 202 and the second external electronic device 204 may include a digital signage device.

Figure 3:
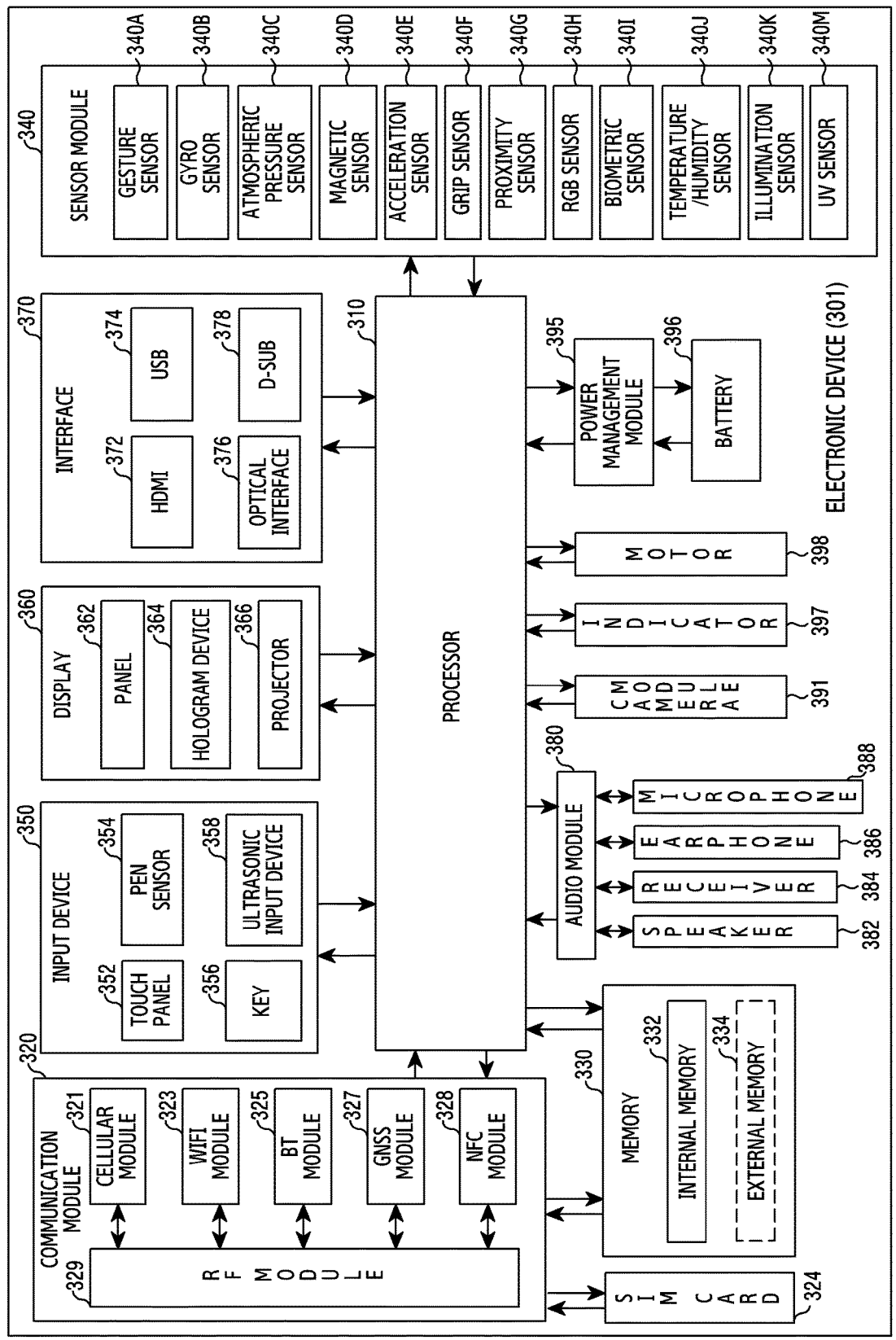
FIG. 3 illustrates a block diagram of an electronic device according to various embodiments of the present invention.

FIG. 3 illustrates a block diagram of an electronic device 301 according to various embodiments of the present invention. The electronic device 301 may include, for example, all or part of the electronic device 201 of FIG. 2.

Referring to FIG. 3, the electronic device 301 may include one or more processors (e.g., APs) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may, for example, control a plurality of hardware or software components connected to the processor 310 by driving an OS or an application program, and perform data processing and operations. The processor 310 may be implemented with, for example, a system on chip (SoC). According to an embodiment, the processor 310 may further include a graphic processing unit (GPU) and/or an ISP. The processor 310 may include at least some (e.g., a cellular module 321) of the components of FIG. 3. The processor 310 may load and process an instruction or data received from at least one of other components (e.g., a nonvolatile memory) to a volatile memory, and store resultant data in the nonvolatile memory.

According to an embodiment, the processor 310 may generate content to be used at the external electronic device. For example, the processor 310 may configure reactive content including at least one interaction provided from the external electronic device and additional content corresponding to each interaction. The processor 310 may set an area for conducting the interaction through the reactive content using an image captured through a sensor (e.g., an image sensor) of the external electronic device.

The communication module 320 may have the same or similar configuration to the communication interface 270 of FIG. 2. The communication module 320 may include, For example, a cellular module 321, a Wi-Fi module 323, a Bluetooth module 325, a GNSS module 327, an NFC module 328, and a radio frequency (RF) module 329.

The cellular module 321 may provide, for example, a voice call, a video call, a text service, or an Internet service through a communication network. According to an embodiment, the cellular module 321 may perform identification and authentication of the electronic device 301 within the communication network by using the subscriber identification module 324 (e.g., a SIM card). According to an embodiment, the cellular module 321 may perform at least some of the functions that may be provided by the processor 310. According to an embodiment, the cellular module 321 may include a CP.

According to an embodiment, at least some (e.g., two or more) of the cellular module 321, the Wi-Fi module 323, the Bluetooth module 325, the GNSS module 327, or the NFC module 328 may be included in one integrated chip (IC) or IC package.

The RF module 329 may transmit/receive, for example, a communication signal (e.g., an RF signal). The RF module 329 may include, for example, a transceiver, a power amp module (PAM), a frequency filter, a low noise amplifier (LNA), or an antenna. According to other embodiment, at least one of the cellular module 321, the Wi-Fi module 323, the Bluetooth module 325, the GNSS module 327, or the NFC module 328 may transmit/receive an RF signal through a separate RF module. The subscriber identification module 324 may include, for example, a card including a subscriber identification module or an embedded SIM, and may include unique identification information (e.g., integrated circuit card identifier (ICCID)) or subscriber information (e.g., international mobile subscriber identity (IMSI)).

The memory 330 (e.g., the memory 230 of FIG. 2) may include, for example, an internal memory 332 or an external memory 334. The internal memory 332 may include at least one of, for example, a volatile memory (e.g., a dynamic random access memory (DRAM), a static RAM (SRAM), or a synchronous dynamic RAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 334 may include a flash drive, for example, a compact flash (CF), secure digital (SD), micro-SD, mini-SD, extreme digital (xD), multi-media card (MMC) or a memory stick. The external memory 334 may be functionally or physically coupled to the electronic device 301 via various interfaces.

The sensor module 340 (e.g., the sensor module 280 of FIG. 2) may, for example, measure a physical quantity or detect an operation state of the electronic device 301, and thus convert the measured or detected information into an electrical signal. The sensor module 340 may include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a biometric sensor 340I, a temperature/humidity sensor 340J, an illumination sensor 340K, and an ultraviolet (UV) sensor 340M. Additionally or alternatively, the sensor module 340 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling one or more sensors included therein. In an embodiment, the electronic device 301 may further include, as part of or separately from the processor 310, a processor configured to control the sensor module 340, and thus may control the sensor module 340 while the processor 310 is sleeping. For example, the temperature/humidity sensor 340J may include a plurality of temperature sensors disposed at different positions.

The input device 350 may include, for example, a touch panel 352, a (digital) pen sensor 354, a key 356, or an ultrasonic input unit 358. The touch panel 352 may use at least one of, for example, an electrostatic type, a pressure-sensitive type, or an ultrasonic type. In addition, the touch panel 352 may further include a control circuit. The touch panel 352 may further include a tactile layer, to provide the user with a tactile reaction. The (digital) pen sensor 354 may, for example, be a part of the touch panel or include a separate recognition panel. The key 356 may include, for example, a physical button, an optical key, or a keypad. The ultrasonic input device 358 may detect ultrasonic waves generated by an input tool through a microphone (e.g., a microphone 388), and identify data corresponding to the detected ultrasonic waves.

The display 360 (e.g., the display 260 of FIG. 2) may include a panel 362, a hologram device 364, a projector 366, and/or a control circuit for controlling them. The panel 362 may be implemented in, for example, a flexible, transparent, or wearable manner. The panel 362 may be configured with one or more modules with the touch panel 352. The hologram device 364 may display a stereoscopic image in the air by using an interference of light. The projector 366 may display an image by projecting a light beam onto a screen. The screen may be located, for example, inside or outside the electronic device 301. The interface 370 may include, for example, an HDMI 372, a USB 374, an optical communication interface 376, or a d-subminiature (D-sub) 378. The interface 370 may be included, for example, in the communication interface 270 of FIG. 2. Additionally or alternatively, the interface 370 may include, for example, a mobile high-definition link (MHL) interface, SD/multi-media card (MMC) interface, or Infrared Data Association (IrDA) interface.

The audio module 380 may, for example, bilaterally convert a sound and an electric signal. At least some components of the audio module 380 may be included, for example, in the input/output interface 250 of FIG. 2. The audio module 380 may process sound information which is inputted or outputted through, for example, a speaker 382, a receiver 384, an earphone 386, or the microphone 388.

The camera module 391 is, for example, a device capable of capturing still images and moving images, and, according to an embodiment, may include one or more image sensors (e.g., a front sensor or a rear sensor), a lens, an ISP, or a flash (e.g., an LED or a xenon lamp). The power management module 395 may, For example, manage power of the electronic device 301.

The power management module 395 may include a power management integrated circuit (PMIC), a charger IC, or a battery or fuel gauge. The PMIC may have a wired and/or wireless charging method. The wireless charging method may include, for example, a magnetic resonance method, a magnetic induction method, or an electromagnetic method, and may further include an additional circuit for the wireless charging, for example, a coil loop, a resonant circuit, or a rectifier circuit. The battery gauge may measure, for example, the remaining capacity, a voltage, current, or temperature of the battery 296 during charging. The battery 296 may include, for example, a rechargeable battery and/or a solar battery.

The indicator 397 may display a specific state of the electronic device 301 or part thereof (e.g., the processor 310), for example, a booting state, a message state, or a charging state. The motor 398 may convert electrical signals into mechanical vibration and generate a vibration or haptic effect. The electronic device 301 may include a mobile TV supporting device (e.g., a GPU) for processing media data according to standards, for example, digital multimedia broadcasting (DMB), digital video broadcasting (DVB), or mediaFlo™.

Each of the above-described components may be configured with one or more components, and the name of a corresponding component may vary according to a type of the electronic device. In various embodiments, the electronic device (e.g., the electronic device 301) may be configured to omit some components, to include an additional component, or to combine some of the components as one entity, wherein functions of previous corresponding components are performed identically.

Figure 4:
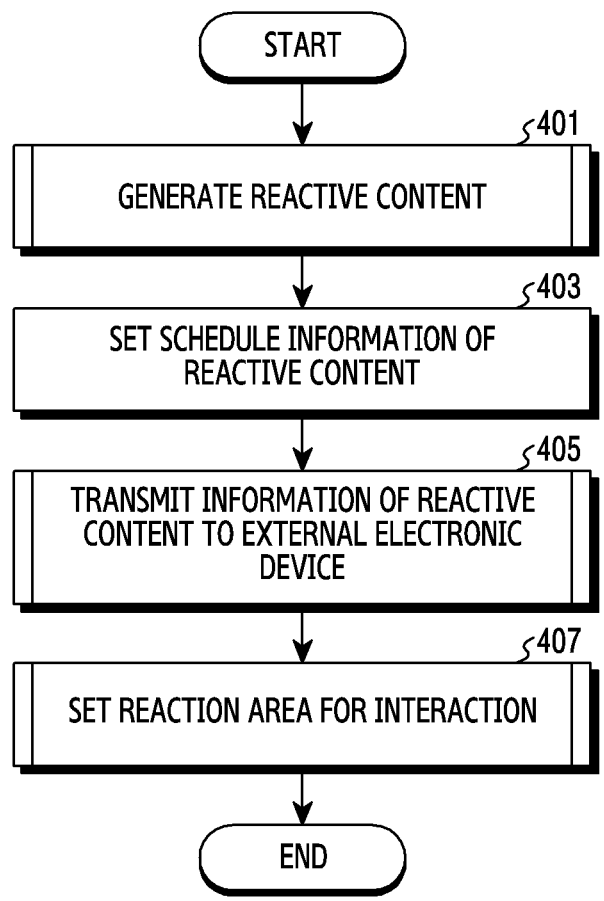
FIG. 4 illustrates a flowchart for generating reactive content in an electronic device according to various embodiments of the present invention.

FIG. 4 illustrates a flowchart for generating reactive content in an electronic device according to various embodiments of the present invention. In the following explanations, the electronic device may include the electronic device 201 of FIG. 2 or at least part (e.g., the processor 220) of the electronic device 201.

Referring to FIG. 4, the electronic device may generate reactive content for providing to an external electronic device (e.g., a digital signage device) in operation 401. For example, the processor 220 may configure the reactive content including an interaction list for the external electronic device 202 or 204 to provide an active service corresponding to context awareness information and additional content for each interaction.

The electronic device may schedule a time for providing the reactive content from the external electronic device in operation 403. For example, the processor 220 may determine the time for providing the reactive content based on characteristics of the reactive content, scheduling information of the content provided from the external electronic device 202 or 204, and surrounding environment information of the external electronic device 202 or 204. For example, the characteristics of the reactive content may include a type of an advertisement to provide through the reactive content.

The electronic device may transmit information of the reactive content to the external electronic device in operation 405. For example, the processor 220 may control the communication interface 2740 to transmit configuration information and schedule information of the reactive content to the external electronic device 202 or 204 through a wireless or wired communication link with the external electronic device 202 or 204.

The electronic device may set an area for an interaction to be provided through the reactive content at the external electronic device in operation 407. For example, the processor 220 may identify an image acquired through a three-dimensional camera of the external electronic device 202 or 204 for providing the reactive content. The processor 220 may correct the image into the form of a top view. The processor 220 may control the display 260 to display a guide interface of a lattice pattern to overlap the top view corrected image. The processor 220 may set a reference area based on a user input to the guide interface of the lattice pattern. The processor 220 may set the area for the interaction by calculating spatial coordinates for the reference area. The processor 220 may map the additional content to an area (e.g., a space for the interaction) for providing the interaction. For example, the processor 220 may set the area for the interaction to map specific additional content, or set the area for the interaction and then select the additional content for mapping the area for the interaction.

Figure 5:
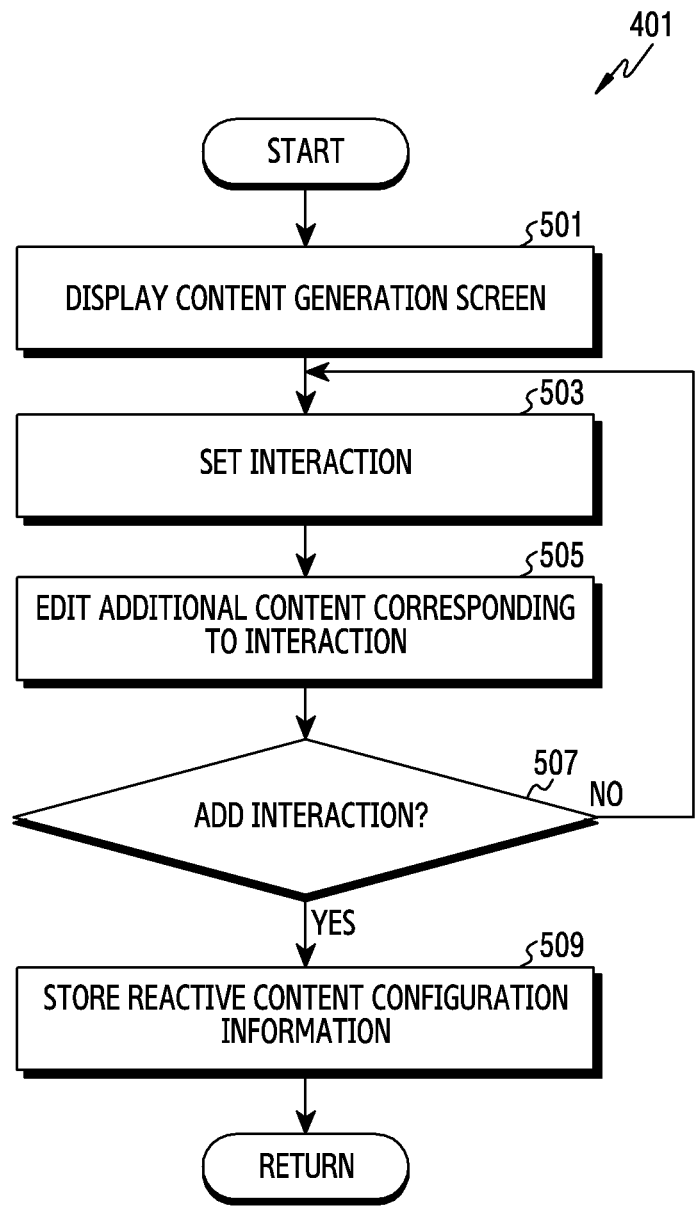
FIG. 5 illustrates a flowchart for configuring reactive content in an electronic device according to various embodiments of the present invention.
Figure 6A:
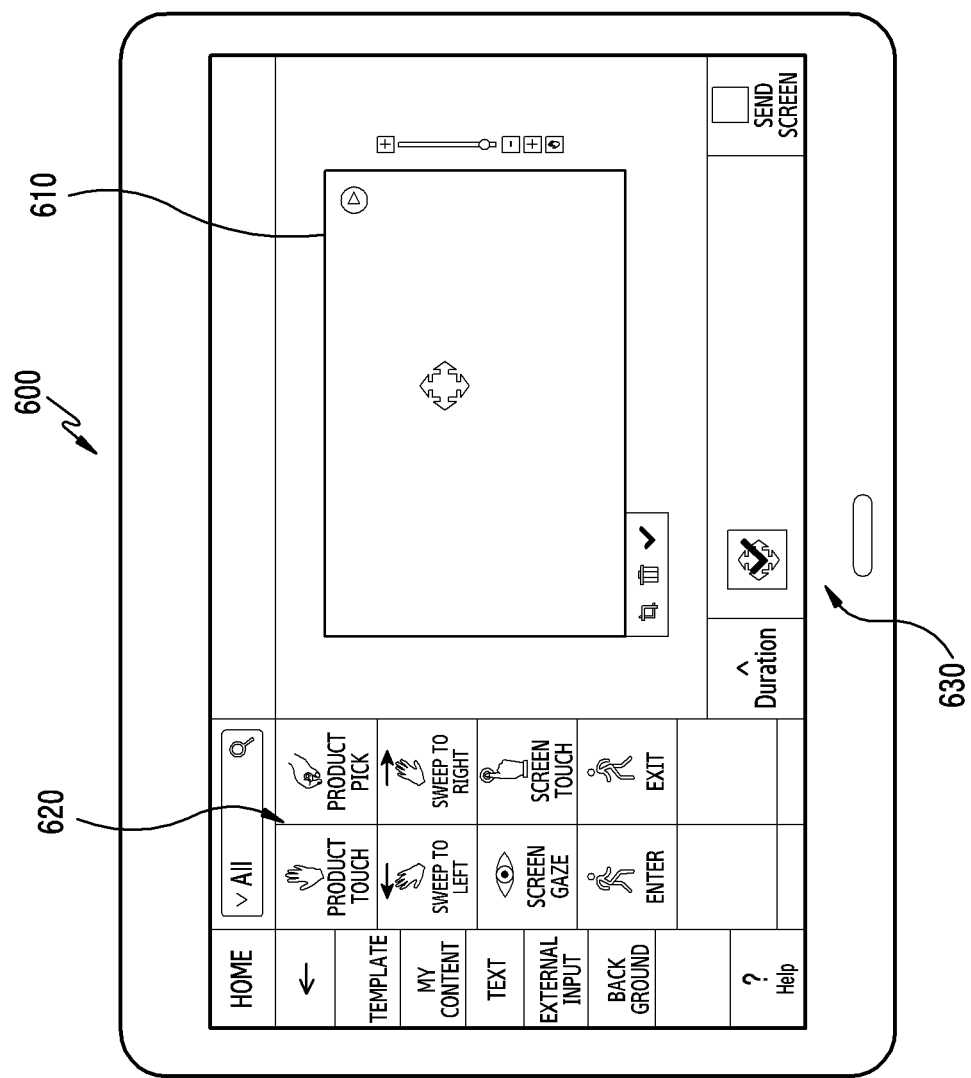
Figure 6B:
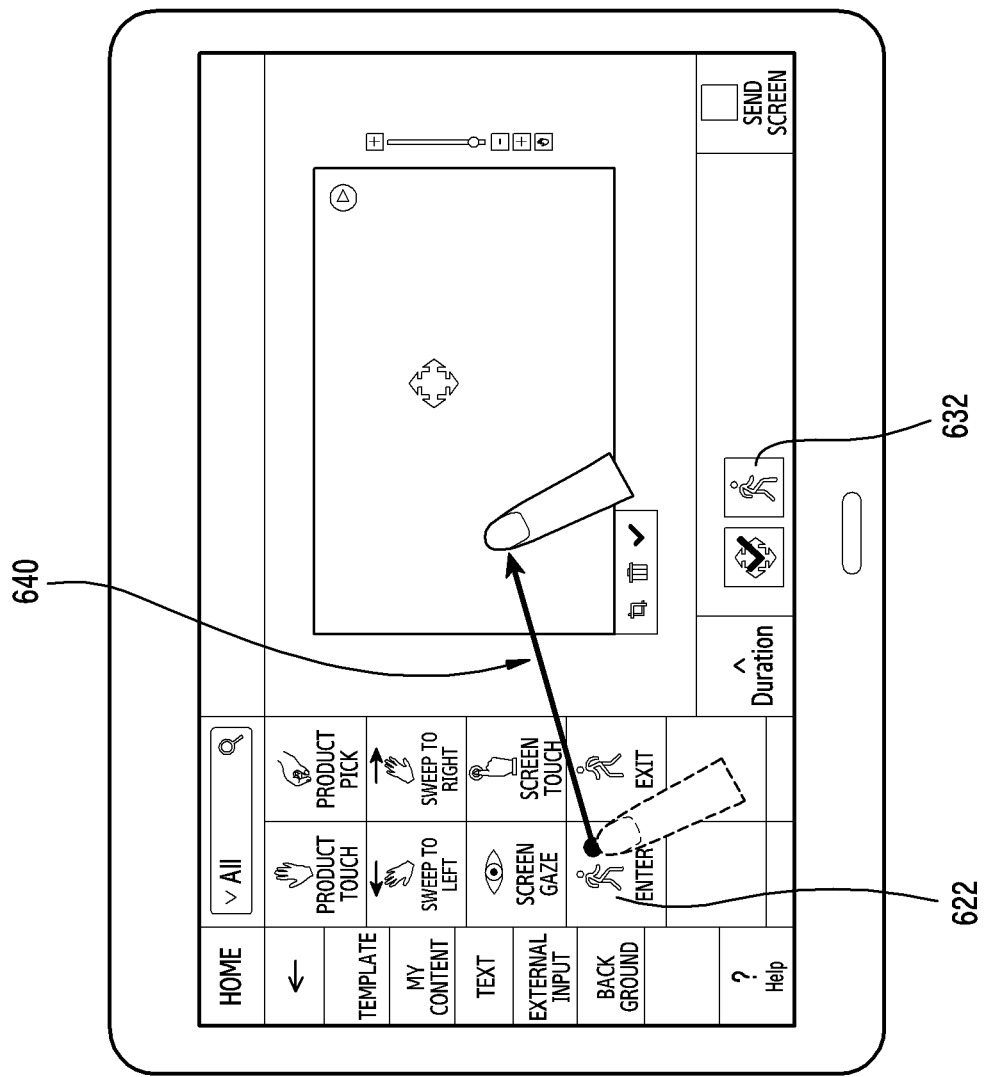

FIG. 5 illustrates a flowchart for configuring reactive content in an electronic device according to various embodiments of the present invention. FIGS. 6A through 6C illustrate a screen configuration for configuring reactive content according to various embodiments of the present invention. The following explanations describe the operation for generating the reactive content in operation 401 of FIG. 4. In the following explanations, the electronic device may include the electronic device 201 of FIG. 2 or at least part (e.g., the processor 220) of the electronic device 201.

Referring to FIG. 5, the electronic device may display a screen for generating the reactive content on a display in operation 501. For example, if detecting occurrence of an event for generating content, the processor 220 may control the display 260 to display a screen 600 for generating the reactive content, as shown in FIG. 6A. For example, the screen 600 for generating the reactive content may include a setting area 610 for setting content or interaction, an interaction element area 620 including at least one interaction which may be added to the reactive content, and a user interface (UI) area 630 for displaying summary information (e.g., thumbnail) of the interaction added to the reactive content.

The electronic device may set an interaction to be added to the reactive content through the screen for generating the reactive content, in operation 503. For example, if an icon "enter" 622 enters the setting area 610 through a drag input 640 for the icon "enter" 622 included in the interaction element area 620 as shown in FIG. 6B, the processor 220 may add the interaction of "enter" to the reactive content. Additionally or alternatively, the processor 220 may display summary information 632 about the interaction of "enter" added to the reactive content in the UI area 630. For example, if the touch input for the icon "enter" 622 is released in the setting area 610, the processor 220 may add the interaction of "enter" to the reactive content.

The electronic device may edit the additional content for the interaction added to the reactive content in operation 505. For example, if detecting a selection input (e.g., a touch input) of the summary information 632 of the interaction "enter" displayed in the UI area 630, as shown in FIG. 6C, the processor 220 may display an additional content list 660 which may be mapped to the interaction "enter" in at least partial area of the display 260. For example, the display 260 may overlap and display the additional content list 660 which may be mapped to the interaction "enter" in the interaction element area 620. If first additional content 662 enters the setting area 610 through a drag input 670 for the first additional content 662 of the additional content list 660, the processor 220 may map the first additional content 662 to the interaction of "enter". Additionally or alternatively, if the touch input to the first additional content 662 is released in the setting area 610, the processor 220 may map the first additional content 662 to the interaction of "enter".

The electronic device may identify whether the interaction is additionally set in the reactive content in operation 507. For example, the processor 220 may identify whether a selection input is detected for an end button displayed in at least partial area of the screen 600 for generating the reactive content. For example, if detecting the selection input for the processor 220 end button, the processor 220 may determine that the interaction addition to the reactive content is finished.

If the interaction addition to the reactive content is not finished, the electronic device may set an interaction to add to the reactive content in operation 503.

If determining that the interaction addition to the reactive content is finished, the electronic device may store configuration information of the reactive content in operation 509. For example, the configuration information of the reactive content may include information of at least one interaction added to the reactive content and the additional content mapped to each interaction.

According to an embodiment, the electronic device may set to interwork a plurality of interactions in the reactive content. For example, the processor 220 may set a first interaction and first additional content corresponding to the first interaction in the reactive content, as in operation 503 through operation 505 of FIG. 5. The processor 220 may set a second interaction and second additional content corresponding to the second interaction in the first interaction. In this case, if detecting the second interaction while providing the first additional content corresponding to the first interaction, the external electronic device 202 or 204 may provide the second additional content.

According to various embodiments of the present invention, if adding the interaction to the reactive content, the electronic device may display an additional content list which may be added to the corresponding interaction in at least partial area of the display.

Figure 7:
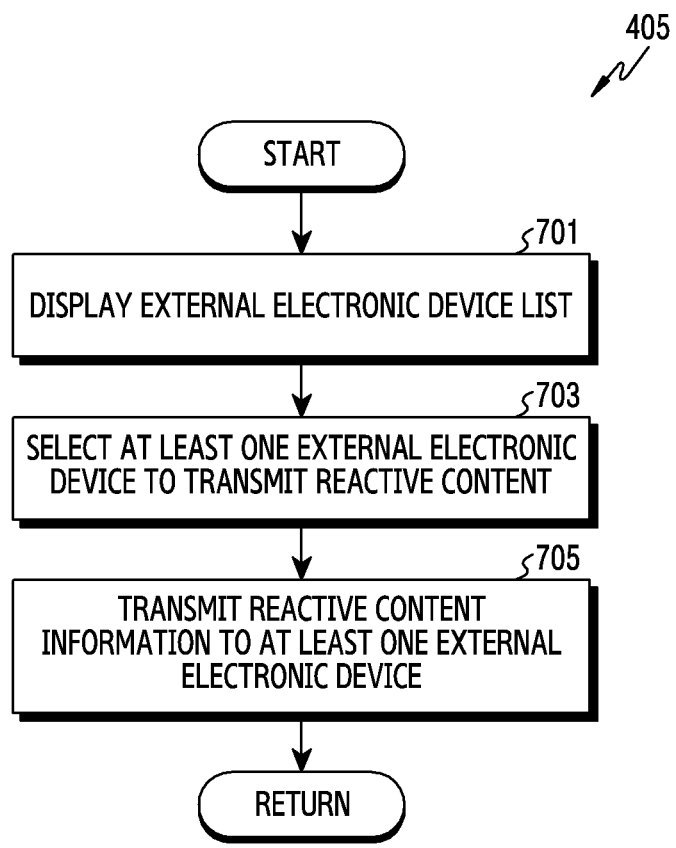
FIG. 7 illustrates a flowchart for transmitting reactive content in an electronic device according to various embodiments of the present invention.
Figure 8:
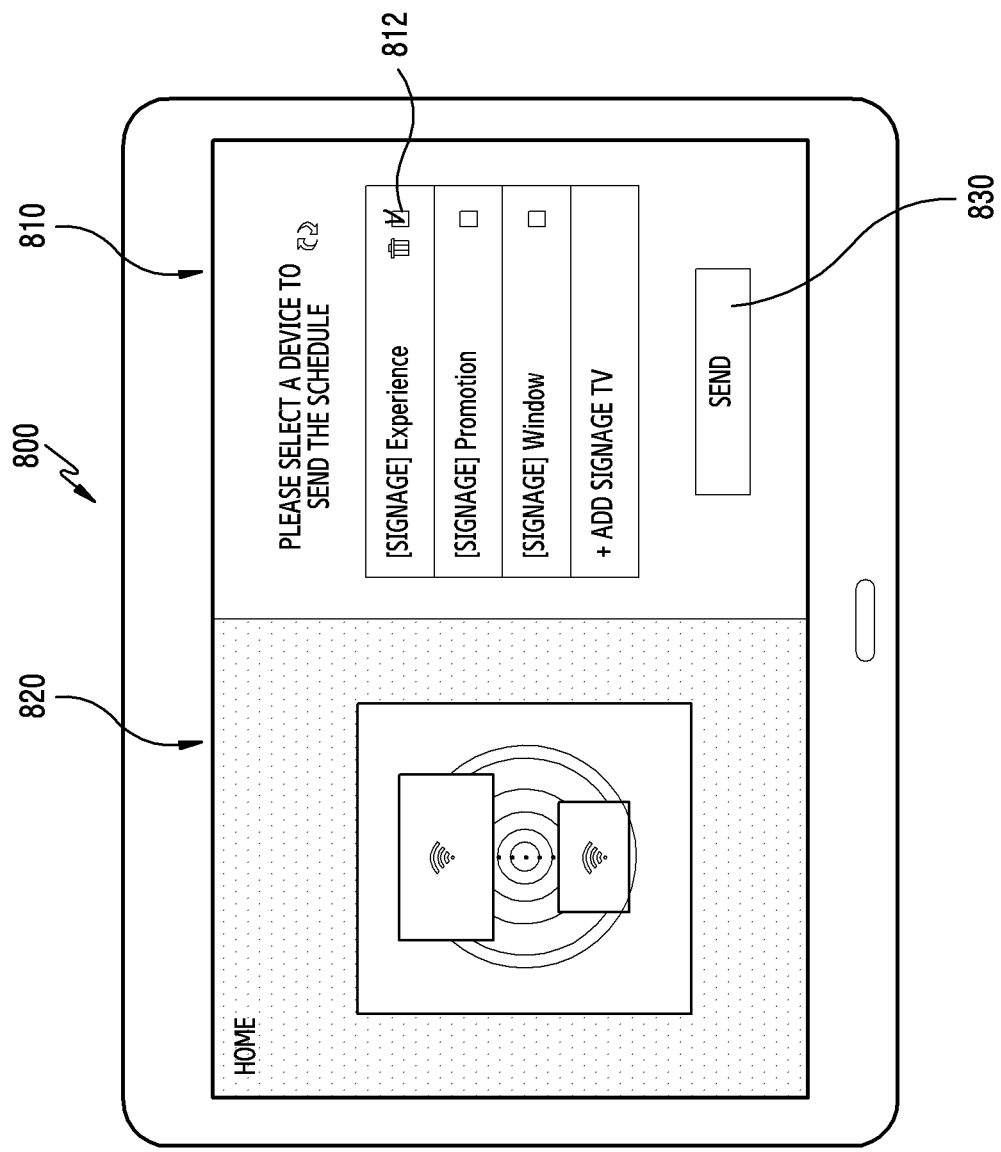
FIG. 8 illustrates a screen configuration for transmitting reactive content according to various embodiments of the present invention.

FIG. 7 illustrates a flowchart for transmitting reactive content in an electronic device according to various embodiments of the present invention. FIG. 8 illustrates a screen configuration for transmitting reactive content according to various embodiments of the present invention. The following explanations describe the operation for transmitting information of the reactive content in operation 405 of FIG. 4. In the following explanations, the electronic device may include the electronic device 201 of FIG. 2 or at least part (e.g., the processor 220) of the electronic device 201.

Referring to FIG. 7, if setting schedule information for the reactive content (e.g., operation 403 of FIG. 4), the electronic device may display an external electronic device list including at least one external electronic device which may transmit the reactive content, in operation 701. For example, if generating and scheduling the reactive content, the processor 220 may control the display 260 to display an external device selection screen 800, as shown in FIG. 8. For example, the external device selection screen 800 may include an external electronic device list 810 for transmitting the reactive content information from the electronic device 201 and a guide interface 820 relating to the transmission of the reactive content.

The electronic device may select at least one external electronic device to transmit the reactive content in operation 703. For example, the processor 220 may select at least one external electronic device to transmit the reactive content based on a user input 812 for the external electronic device list 810 of the external device selection screen 800, as shown in FIG. 8.

The electronic device may transmit reactive content information to the at least one external electronic device in operation 705. For example, if detecting a selection input of a send icon 830 in the external device selection screen 800 as shown in FIG. 8, the processor 220 may determine that the selection of the external electronic device to transmit the reactive content is finished. The processor 220 may transmit configuration information and schedule information of the reactive content to the at least one external electronic device selected through the external device selection screen 800.

Figure 9:
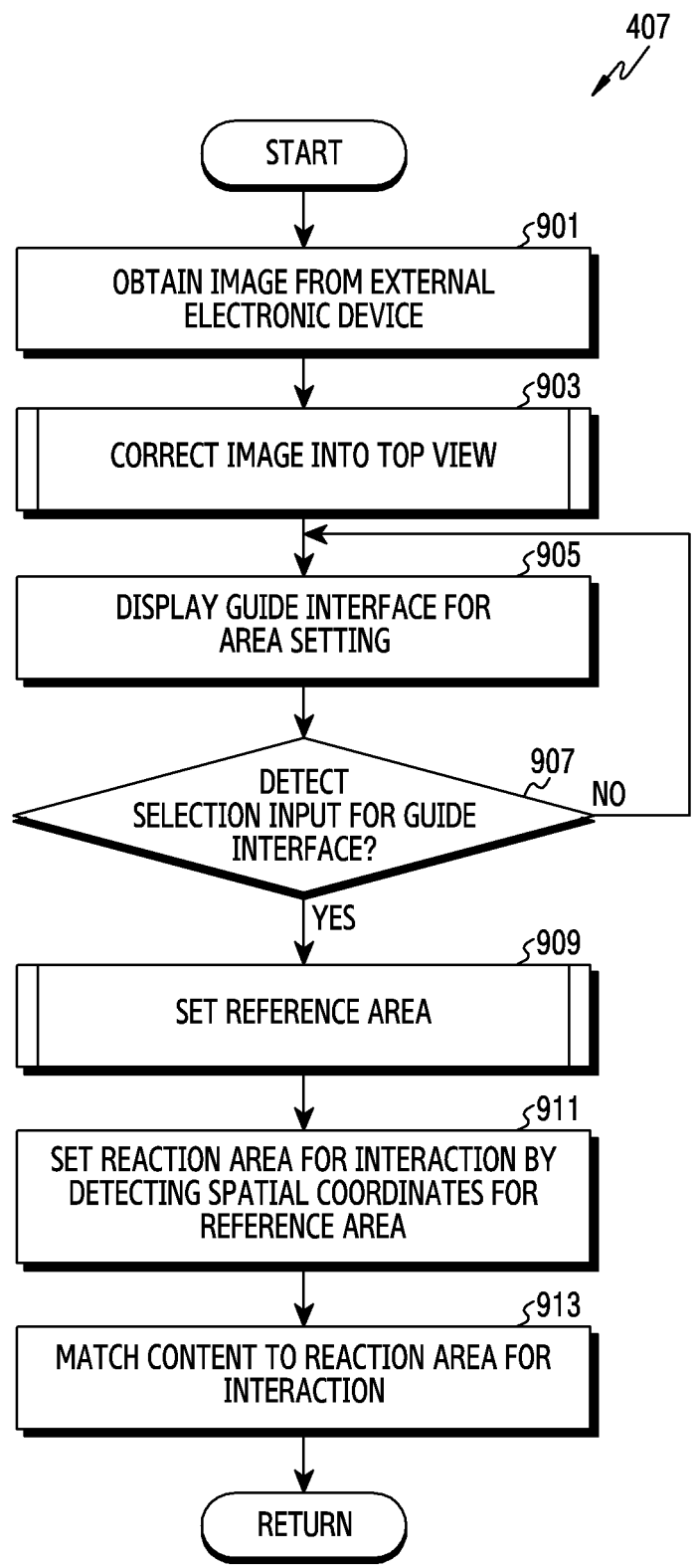
FIG. 9 illustrates a flowchart for setting an interaction area in an electronic device according to various embodiments of the present invention.

FIG. 9 illustrates a flowchart for setting an interaction area in an electronic device according to various embodiments of the present invention. FIGS. 10A through 10E illustrate a screen configuration for setting an interaction area according to various embodiments of the present invention. The following explanations describe the operation for setting the area for the interaction in operation 407 of FIG. 4. In the following explanations, the electronic device may include the electronic device 201 of FIG. 2 or at least part (e.g., the processor 220) of the electronic device 201.

Referring to FIG. 9, if transmitting information of reactive content to an external electronic device (e.g., operation 405 of FIG. 4), the electronic device may obtain an image from the external electronic device in operation 901. For example, the processor 220 may receive a reactive content image acquired through a sensor (e.g., a three-dimensional camera) of the external electronic device from the external electronic device through the communication interface 270. Additionally or alternatively, if detecting occurrence of an event for setting an interaction area, the processor 220 may transmit an image information request signal to the external electronic device to which the reactive content is transmitted. For example, the event for setting the interaction area may include at least one of selection input of an area setting menu and transmission of the reactive content.

Figure 10A:
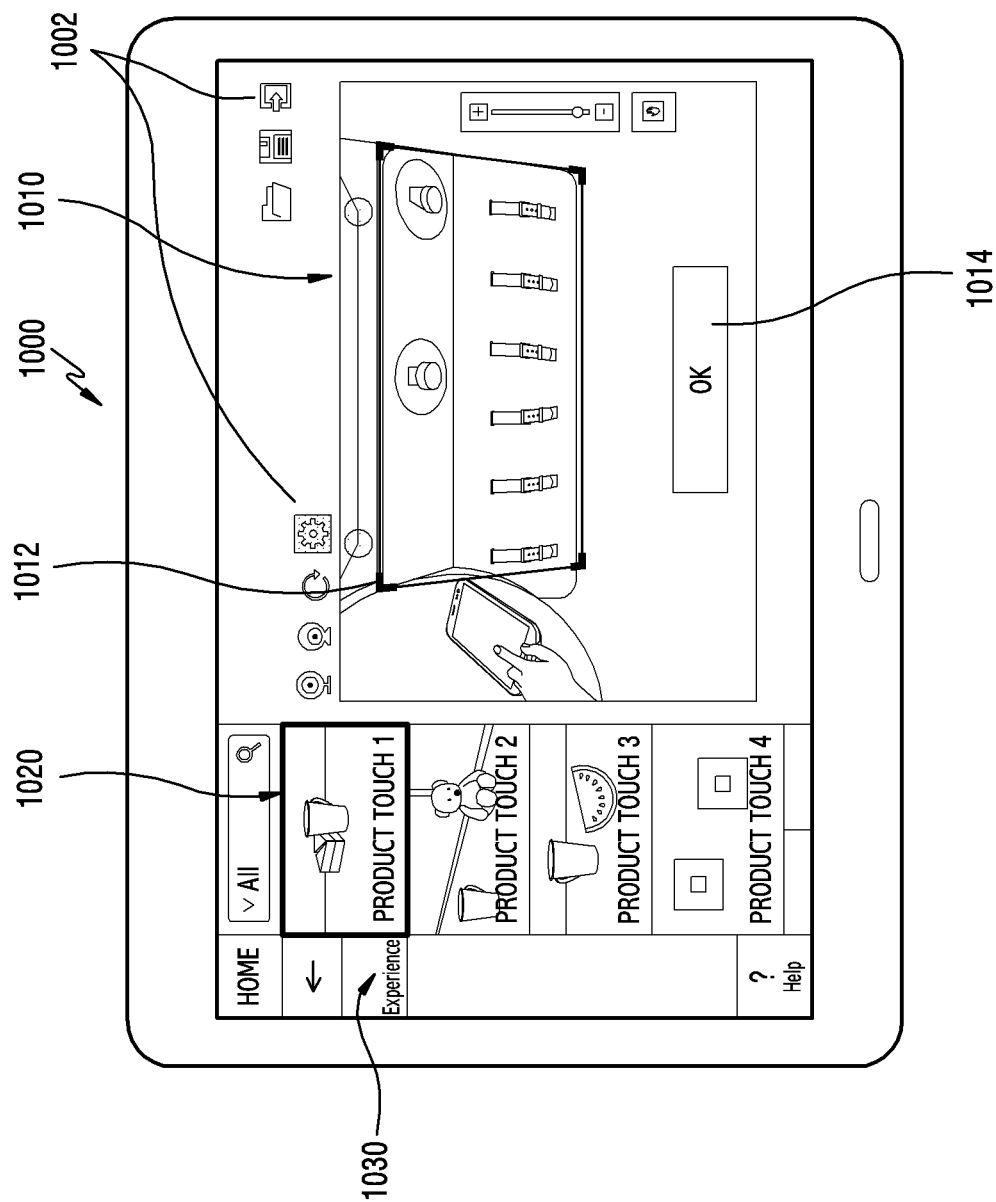
FIGS. 10A through 10E illustrate a screen configuration for setting an interaction area according to various embodiments of the present invention.

The electronic device may perform top view correction on a service area of the image obtained from the external electronic device in operation 903. For example, if detecting the occurrence of the event for setting the interaction area, the processor 220 may control the display 260 to display an area setting screen 1000 of the interaction as shown in FIG. 10A. The processor 220 may display the image obtained from the external electronic device in a canvas area 1010 of the area setting screen 1000. The processor 220 may perform the top view correction for accurate area setting using lattice cells in the image displayed in the canvas area 1010. For example, the area setting screen 1000 may include an additional content list 1020 mapped to the interaction, an external electronic device list 1030 for setting the interaction area, and at least one control menu 1002. The control menu 1002 may include at least one of open, store, close, and new. Additionally or alternatively, the processor 220 may perform calibration on the sensor of the external electronic device. For example, the processor 220 may perform the calibration on the sensor of the external electronic device and then top view correct the image obtained from the external electronic device.

Figure 10B:
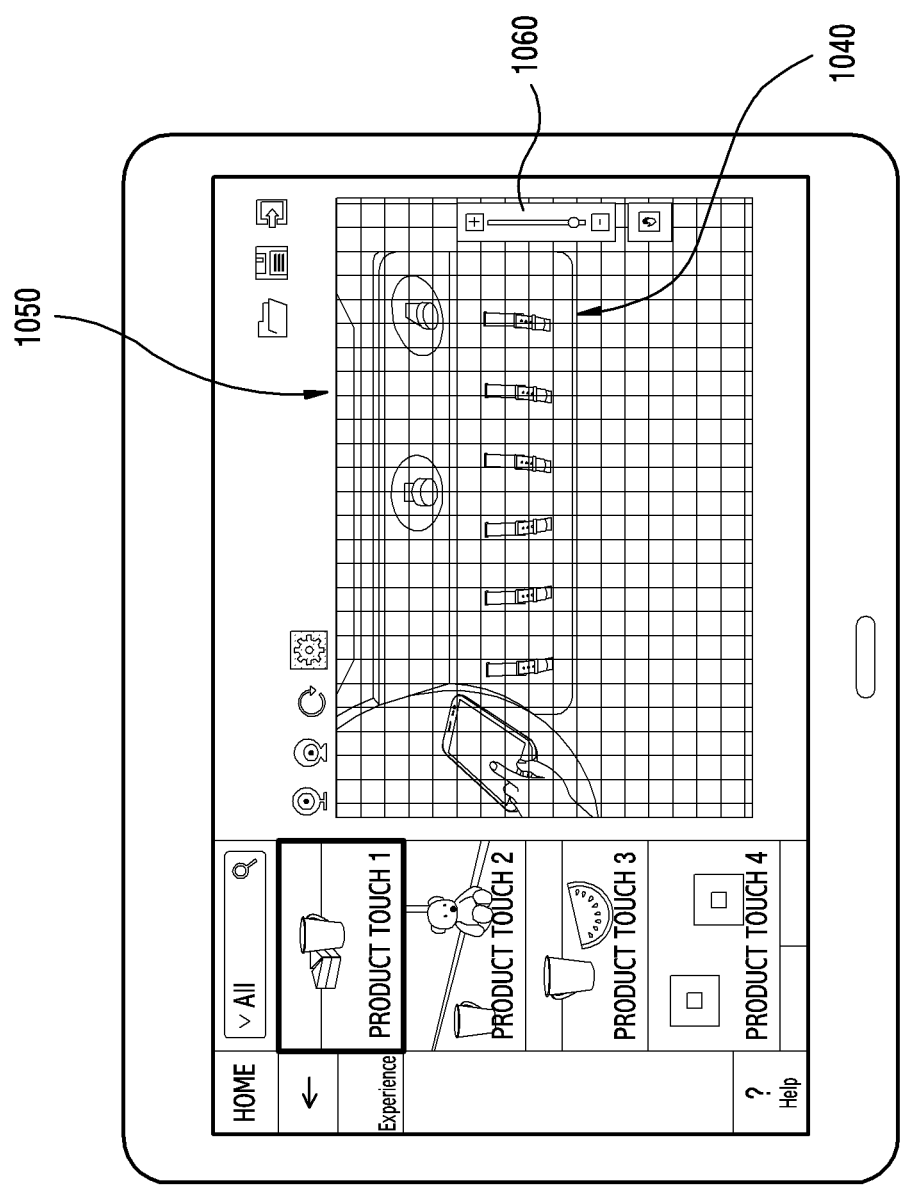
Figure 10C:
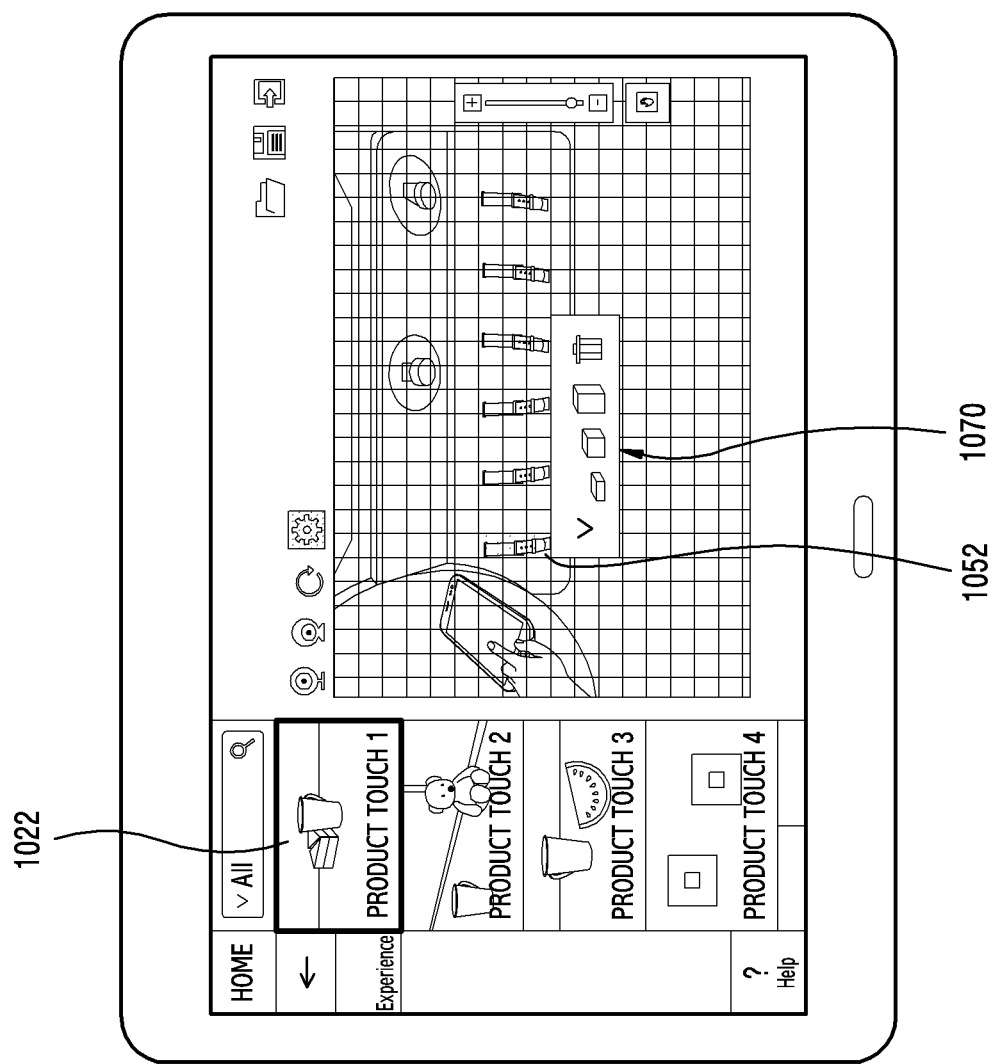
Figure 10D:
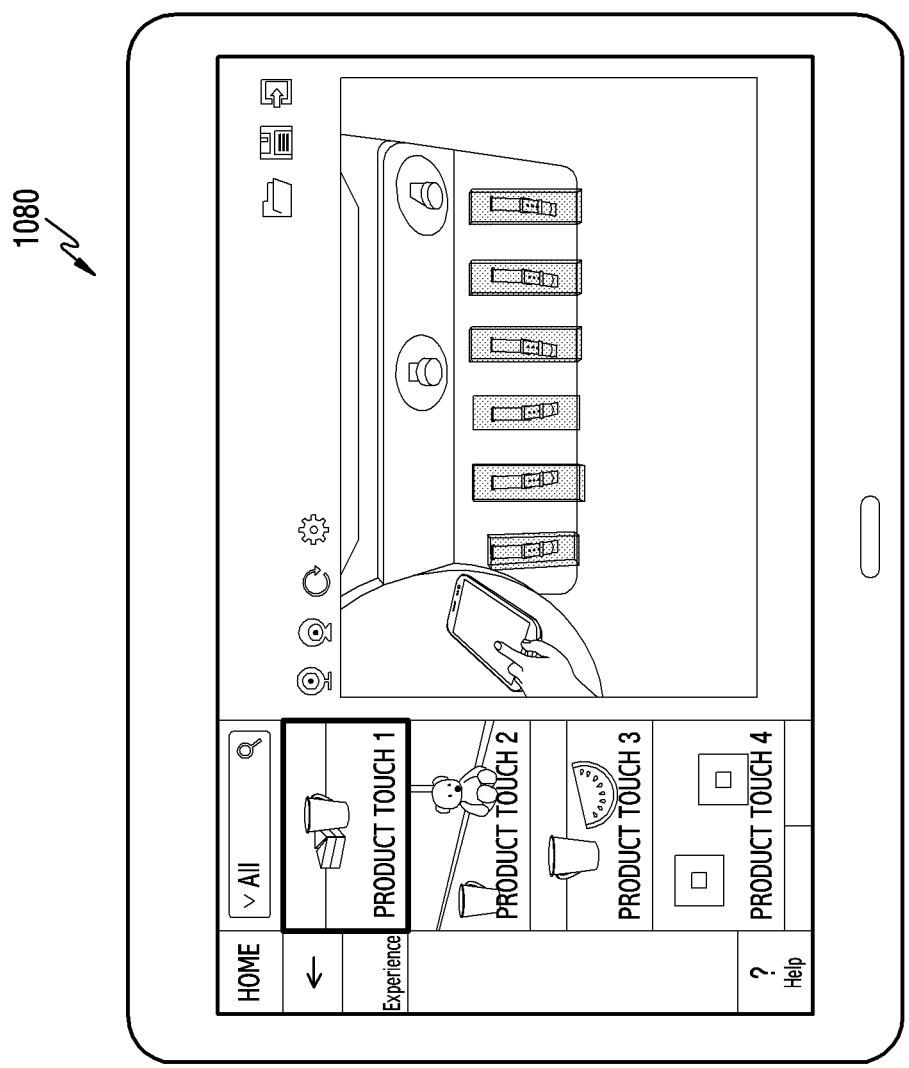
Figure 10E:
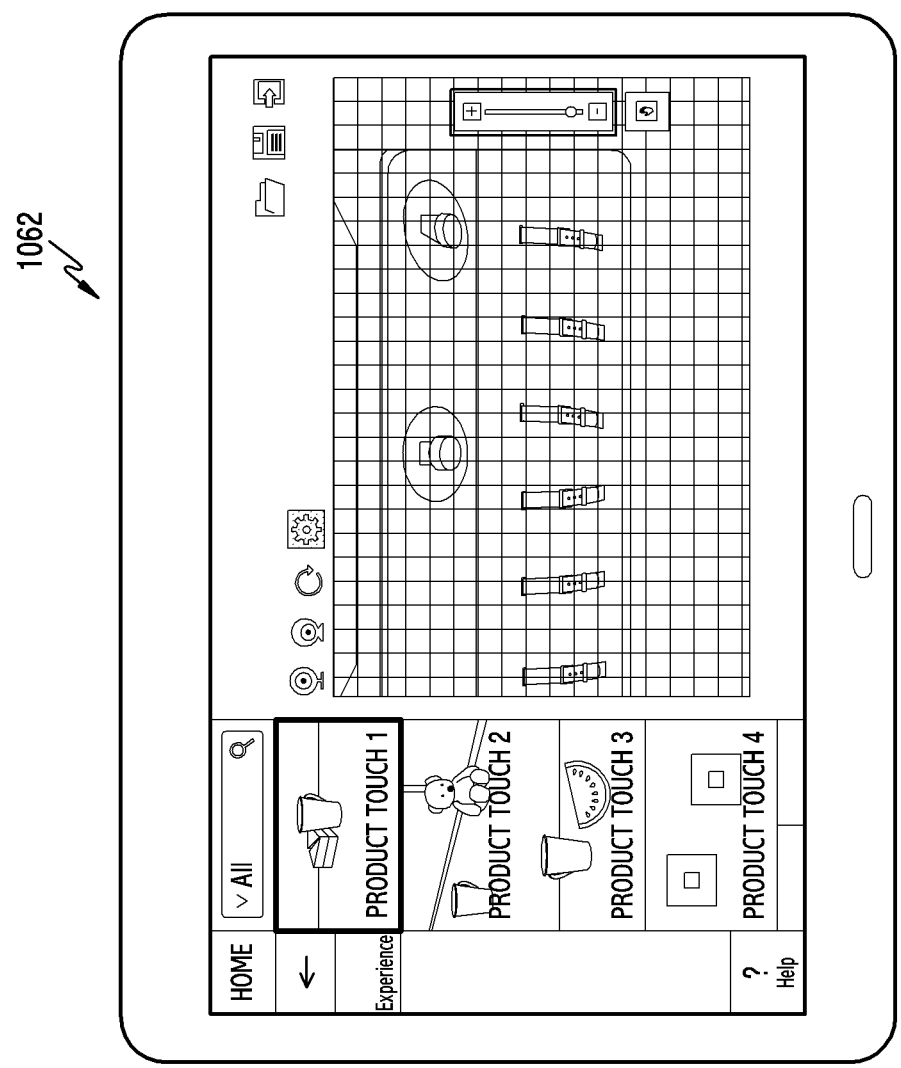

The electronic device may display a guide interface for setting the interaction area to overlap the top view corrected image in operation 905. For example, the processor 220 may control the display 260 to display a guide interface 1050 of a lattice pattern to overlap a top view corrected image 1040, as shown in FIG. 10B. Additionally or alternatively, the processor 220 may adjust a size of the image 1062 based on a user input for a size adjust menu 1060 displayed in at least partial area of the guide interface 1050, as shown in FIG. 10E.

The electronic device may identify whether a user input for the guide interface is detected in operation 907. For example, the processor 220 may identify whether a user input (e.g., touch input) for the lattice pattern displayed in the display 260 is detected, as shown in FIG. 10C.

If not detecting the user input for the guide interface, the electronic device may keep displaying the guide interface for setting the interaction area in operation 905. For example, if not detecting the user input over a reference time through the guide interface for setting the interaction area, the electronic device may determine that the interaction area setting is finished.

If detecting the user input for the guide interface, the electronic device may set at least one cell where the user input is detected in the user interface, as a reference area in operation 909. For example, the processor 220 may set at least one cell corresponding to the user input in the guide interface 1050 of the lattice pattern, as a reference area 1052, as shown in FIG. 10C. Additionally or alternatively, if setting the reference area 1052, the processor 220 may control the display 260 to display a space setting menu 1070 for setting a height of the space for the interaction area setting.

The electronic device may set an area for the interaction by detecting spatial coordinates for the reference area, in operation 911. For example, the processor 220 may set a reaction area 1080 for recognizing the interaction by calculating actual spatial coordinates of the reference area including at least one cell of the lattice pattern, as shown in FIG. 10D. Additionally or alternatively, the processor 220 may set the reaction area for recognizing the interaction based on input information of the space setting menu 1070 of FIG. 10C. For example, the reaction area for the interaction may include, if recognizing a user's action in a corresponding area through a sensor of the external electronic device, an area (space) configured to provide content (additional content) corresponding to the user's action.

The electronic device may map the content (additional content) to the area for the interaction in operation 913. For example, the processor 220 may map additional content 1022 selected in the additional content list 1020 of the area setting screen 1000 to the area for the interaction before setting the reference area in shown in FIG. 10C. For example, if setting the area for the interaction, the processor 220 may select at least one additional content based on an input for the additional content list 1020. The processor 1020 may map the additional content selected from the additional content list 1020 to the area for the interaction.

According to various embodiments of the present invention, the electronic device may adjust an interval of the lattice pattern using the size adjust menu 1060 of FIG. 10B.

Figure 11:
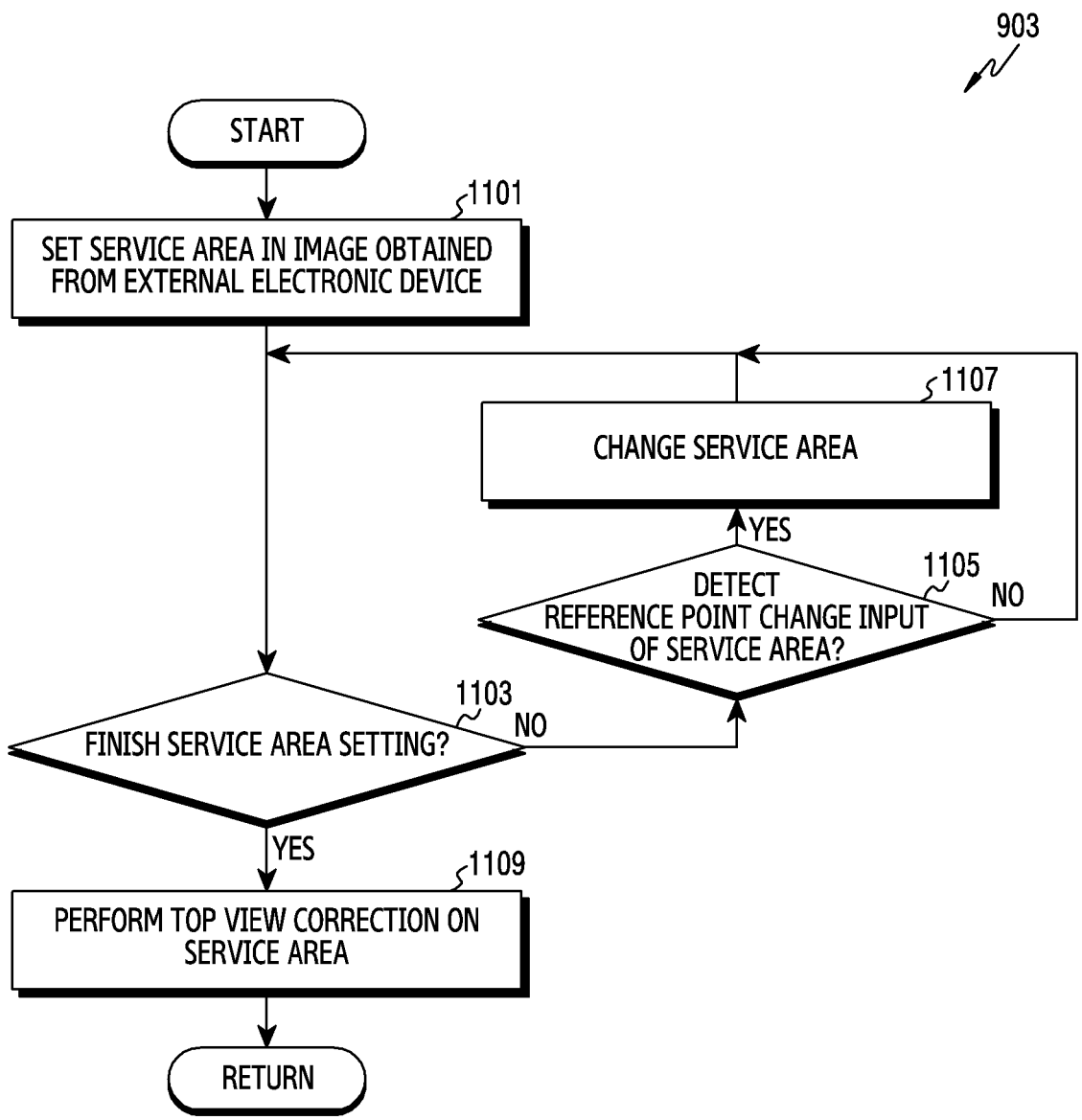
FIG. 11 illustrates a flowchart for setting a service area in an electronic device according to various embodiments of the present invention.

FIG. 11 illustrates a flowchart for setting a service area in an electronic device according to various embodiments of the present invention. The following explanations describe the operation for top view correcting the image in operation 903 of FIG. 9. In the following explanations, the electronic device may include the electronic device 201 of FIG. 2 or at least part (e.g., the processor 220) of the electronic device 201.

Referring to FIG. 11, if obtaining an image from an external electronic device to which reactive content is transmitted (e.g., operation 901 of FIG. 9), the electronic device may set at least part of the image obtained from the external electronic device as a service area in operation 1101. For example, the processor 220 may set a table as a service area 1012 in an image 1010 obtained from the external electronic device, as shown in FIG. 10A. For example, the service area may include at least partial area for setting an area for an interaction in the image obtained from the external electronic device.

The electronic device may identify whether the service area setting is finished in operation 1103. For example, if detecting a selection input of an OK button 1014 included in at least partial area of the image 1010 obtained from the external electronic device, as shown in FIG. 10A, the processor 220 may determine that the service area setting is finished.

If the service area setting is not finished, the electronic device may identify whether a change input of the service area is detected in operation 1105. For example, the processor 220 may set a vertex of the service area 1012 displayed in the display 260 as a reference point for changing the area, as shown in FIG. 10A. The processor 220 may identify whether a touch input for at least one reference point is detected. For example, the processor 220 may identify whether the touch input for changing a position of the service area 1012 displayed in the display 260 is detected.

If not detecting the change input of the service area, the electronic device may identify whether the service area setting is finished in operation 1103. For example, if not detecting the change input of the service area over a reference time from the time of setting the service area, the electronic device may determine that the service area setting is finished.

If detecting the change input of the service area, the electronic device may change a size or a position of the service area based on the change input of the service area, in operation 1107. For example, if detecting a touch input (e.g., drag input) for the vertex of the service area 1012 displayed in the display 260, the processor 220 may change the size of the service area 1012 based on the touch input. For example, the processor 220 may change the position of the service area 1012 based on the touch input (e.g., drag input) for changing the position of the service area 1012 displayed in the display 260.

If changing the size or the position of the service area, the electronic device may identify whether the service area setting is finished, in operation 1103.

If finishing the service area setting, the electronic device may perform the top view correction on the service area in operation 1109. For example, the electronic device may perform the top view correction on the image so as to set an accurate area using cells (guide interface) of the lattice in the service area of the image obtained from the external electronic device.

Figure 12:
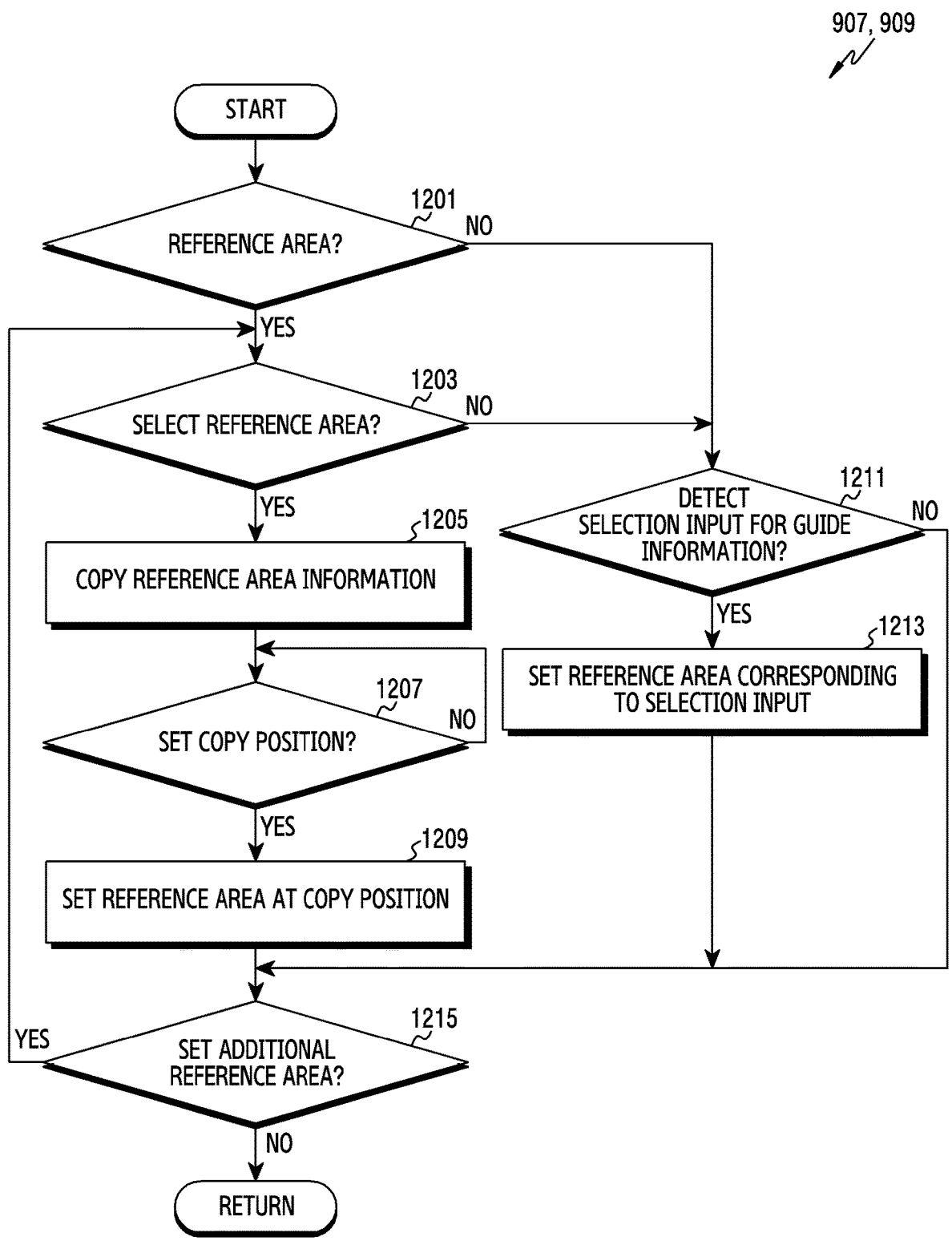
FIG. 12 illustrates a flowchart for copying an interaction area in an electronic device according to various embodiments of the present invention.
Figure 13A:
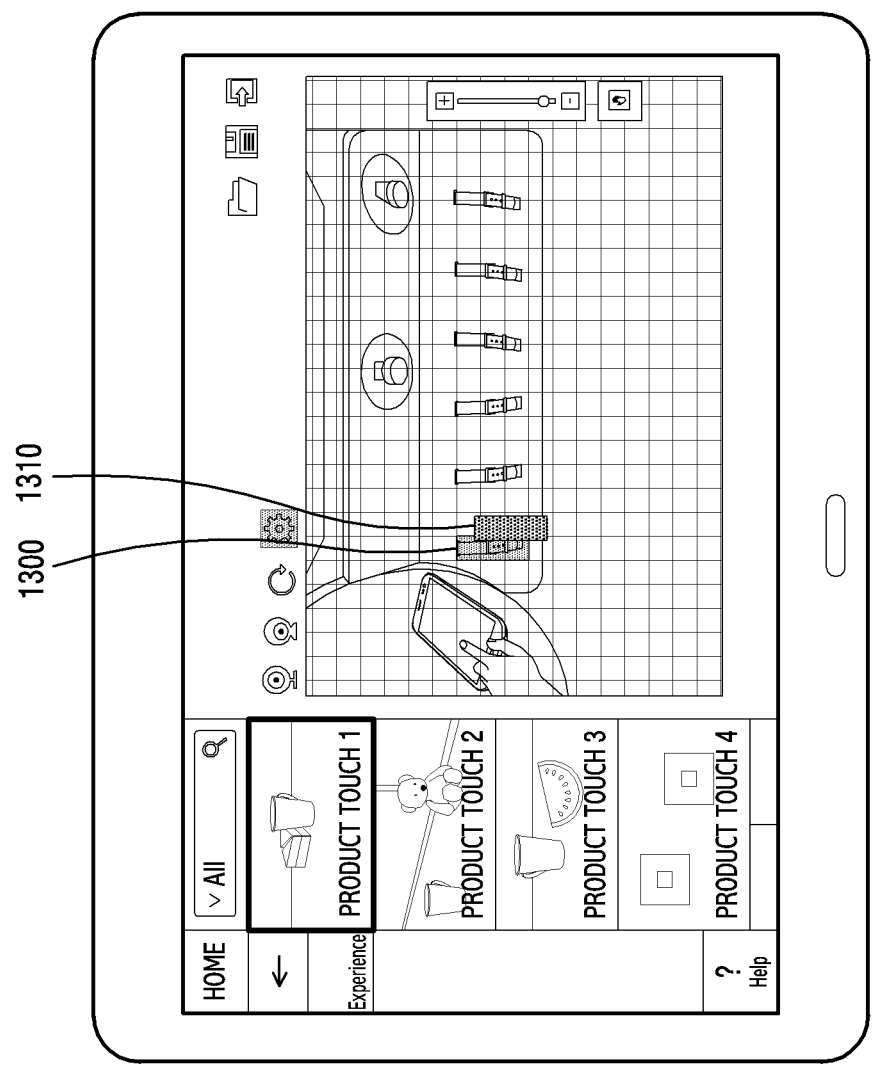
FIGS. 13A through 13B illustrate a screen configuration for copying an interaction area according to various embodiments of the present invention.
Figure 13B:
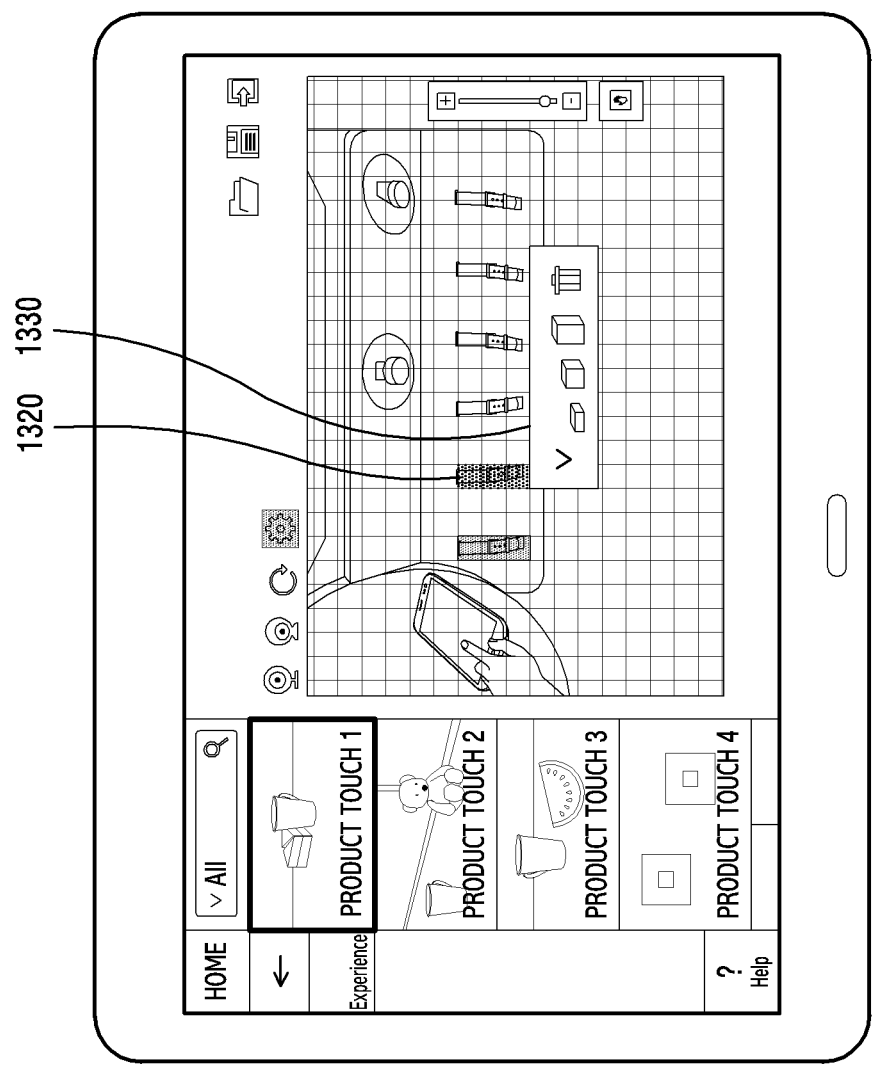

FIG. 12 illustrates a flowchart for copying an interaction area in an electronic device according to various embodiments of the present invention. FIGS. 13A through 13B illustrate a screen configuration for copying an interaction area according to various embodiments of the present invention. The following explanations describe the operation for setting the reference area in operation 907 and operation 909 of FIG. 9. In the following explanations, the electronic device may include the electronic device 201 of FIG. 2 or at least part (e.g., the processor 220) of the electronic device 201.

Referring to FIG. 12, if displaying a guide interface of a lattice pattern by overlapping an image (e.g., operation 905 of FIG. 9), the electronic device may identify whether there is a preset reference area in the guide interface of the lattice pattern in operation 1201. The processor 220 may identify whether there is a preset area for the interaction or the reference area corresponding to the area for the interaction in the reactive content.

If there is the preset reference area in the guide interface of the lattice pattern, the electronic device may identify whether a selection input for copying the preset reference area is detected in operation 1203. For example, the processor 220 may identify a first preset reference area 1300 in the guide interface of the lattice pattern, as shown in FIG. 13A. If a maintenance time of the touch input for the first reference area 1300 exceeds a reference time, the processor 220 may determine that the selection input for copying the preset reference area 1300 is detected.

If detecting the selection input for copying the preset reference area, the electronic device may copy information of the preset reference area in operation 1205. For example, if the maintenance time of the touch input for the first reference area 1300 exceeds the reference time, the processor 220 may generate a copy area 1310 corresponding to the first reference area 1300, as shown in FIG. 13A.

The electronic device may identify whether a position for copying the reference area is set in operation 1207. For example, the processor 220 may identify whether an input for setting the copying position is detected through the input/output interface 250 (e.g., a touch panel).

If setting the copy position, the electronic device may set an additional reference area corresponding to the reference area at the copy position in operation 1209. For example, if detecting a drag input for the copy area 1310 corresponding to the first reference area 1300, as shown in FIG. 13A, the processor 220 may determine a point where the drag input is released as the copy position. The processor 220 may set a second reference area 1320 corresponding to the first reference area 1300 to correspond to the lattice pattern displayed at the drag input release point, as shown in FIG. 13B. Additionally or alternatively, if setting the second reference area 1320, the processor 220 may display the space setting unit 1330 for setting the space (e.g., height) of the area for the interaction in at least part of the display 260.

If there is no preset reference area or if the selection input for copying the preset reference area is not detected, the electronic device may identify whether a selection input for the guide interface of the lattice pattern displayed to overlap the image obtained from the external device is detected in operation 1211. For example, the processor 220 may identify whether a touch input for at least one cell of the lattice pattern displayed in the display 260 is detected.

If detecting the selection input for the guide interface of the lattice pattern form, the electronic device may set a reference area corresponding to the user input in operation 1213. For example, the processor 220 may set at least one cell where the touch input is detected in the lattice pattern displayed in the display 260 as the reference area.

If setting the reference area or not detecting the selection input for the guide interface, the electronic device may identify whether an input for setting an additional reference area is detected in operation 1215. For example, the processor 220 may identify whether the user input for the guide interface of the lattice pattern displayed in the display 260 is detected. For example, if not detecting the user input for the guide interface of the lattice pattern displayed in the display 260 for a reference time, the processor 220 may determine that the reference area setting is finished. For example, if detecting a selection input for a setting end icon displayed in at least partial area of the display 260, the processor 220 may determine that the reference area setting is finished.

According to an embodiment, if copying the preset reference area, the electronic device may also copy additional content information mapped to the corresponding reference area.

Figure 14:
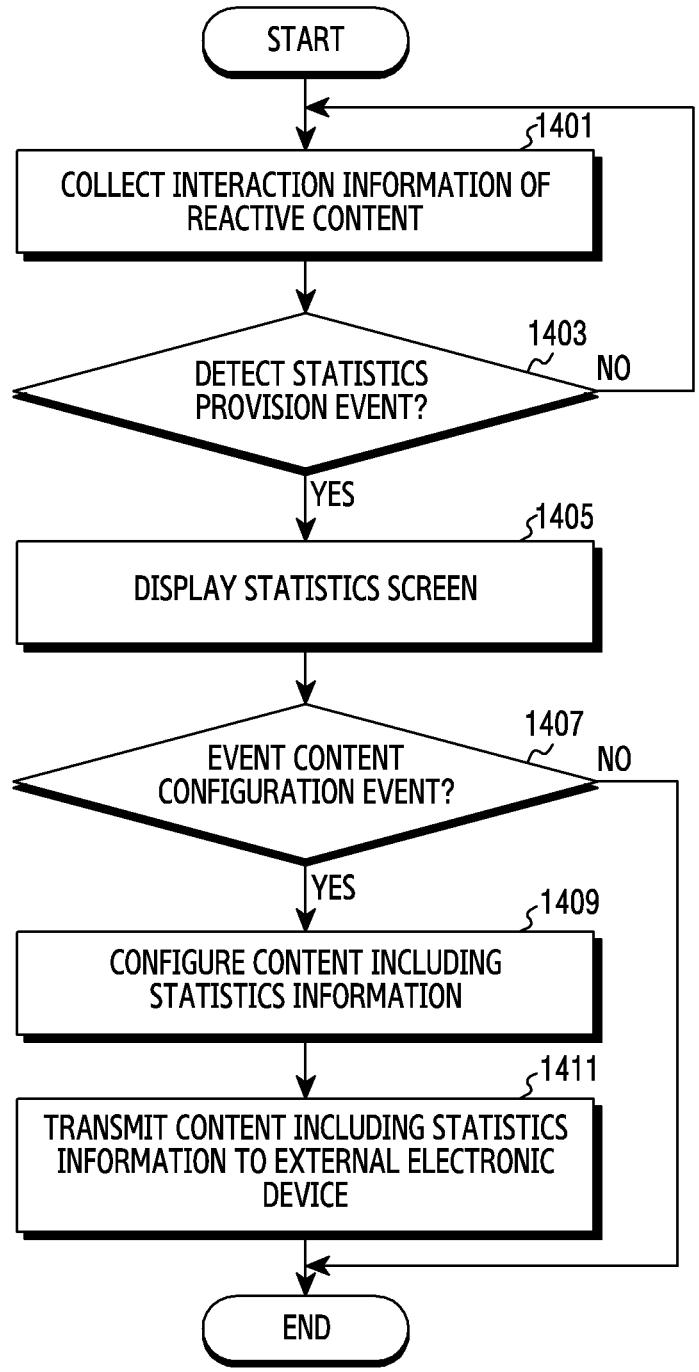
FIG. 14 illustrates a flowchart for generating content using statistics information in an electronic device according to various embodiments of the present invention.

FIG. 14 illustrates a flowchart for generating content using statistics information in an electronic device according to various embodiments of the present invention. FIGS. 15A through 15E illustrate a screen configuration for generating content using statistics information according to various embodiments of the present invention. The following explanations describe the operation for generating the reactive content in operation 401 of FIG. 4. In the following explanations, the electronic device may include the electronic device 201 of FIG. 2 or at least part (e.g., the processor 220) of the electronic device 201.

Referring to FIG. 14, if an external electronic device which establishes a communication link with the electronic device plays reactive content, the electronic device may collect interaction information of the reactive content from the external electronic device in operation 1401. For example, the processor 220 may collect the number of executions for each interaction which is set in the reactive content at the external electronic device. For example, the processor 220 may collect the interaction information of the reactive content on a periodic basis, or collect the interaction information in real time from the time when the external electronic device performs the interaction.

The electronic device may identify whether occurrence of an event for providing statistics information is detected in operation 1403. For example, the processor 220 may identify whether a user input for identifying the statistics information regarding the interaction of the reactive content is detected. For example, the user input for identifying the statistics information may include a selection input of a statistics information display menu and a gesture input corresponding to the event of the statistics information provision.

If not detecting the occurrence of the event for providing the statistics information, the electronic device may collect interaction information of the reactive content from the external electronic device, in operation 1401.

Figure 15A:
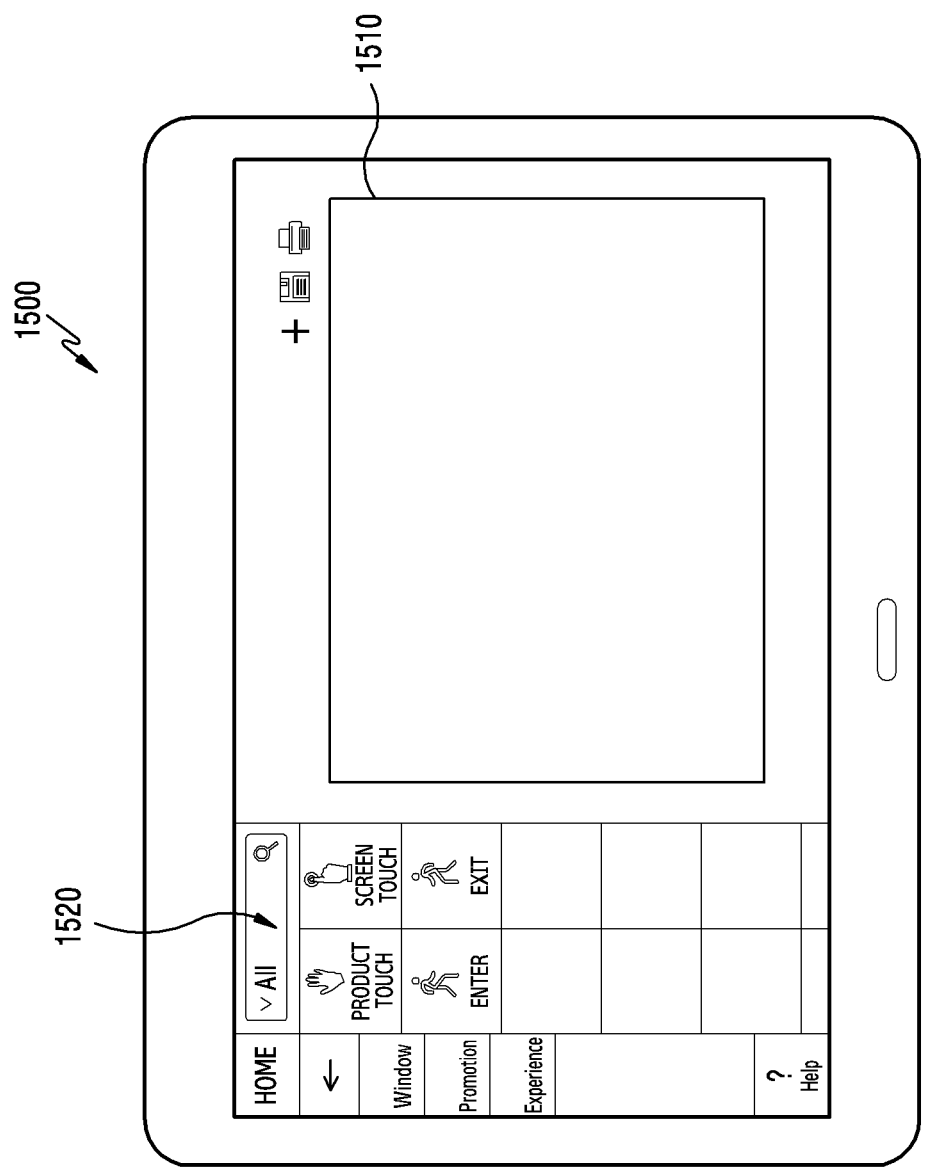
FIGS. 15A through 15E illustrate a screen configuration for generating content using statistics information according to various embodiments of the present invention.
Figure 15B:
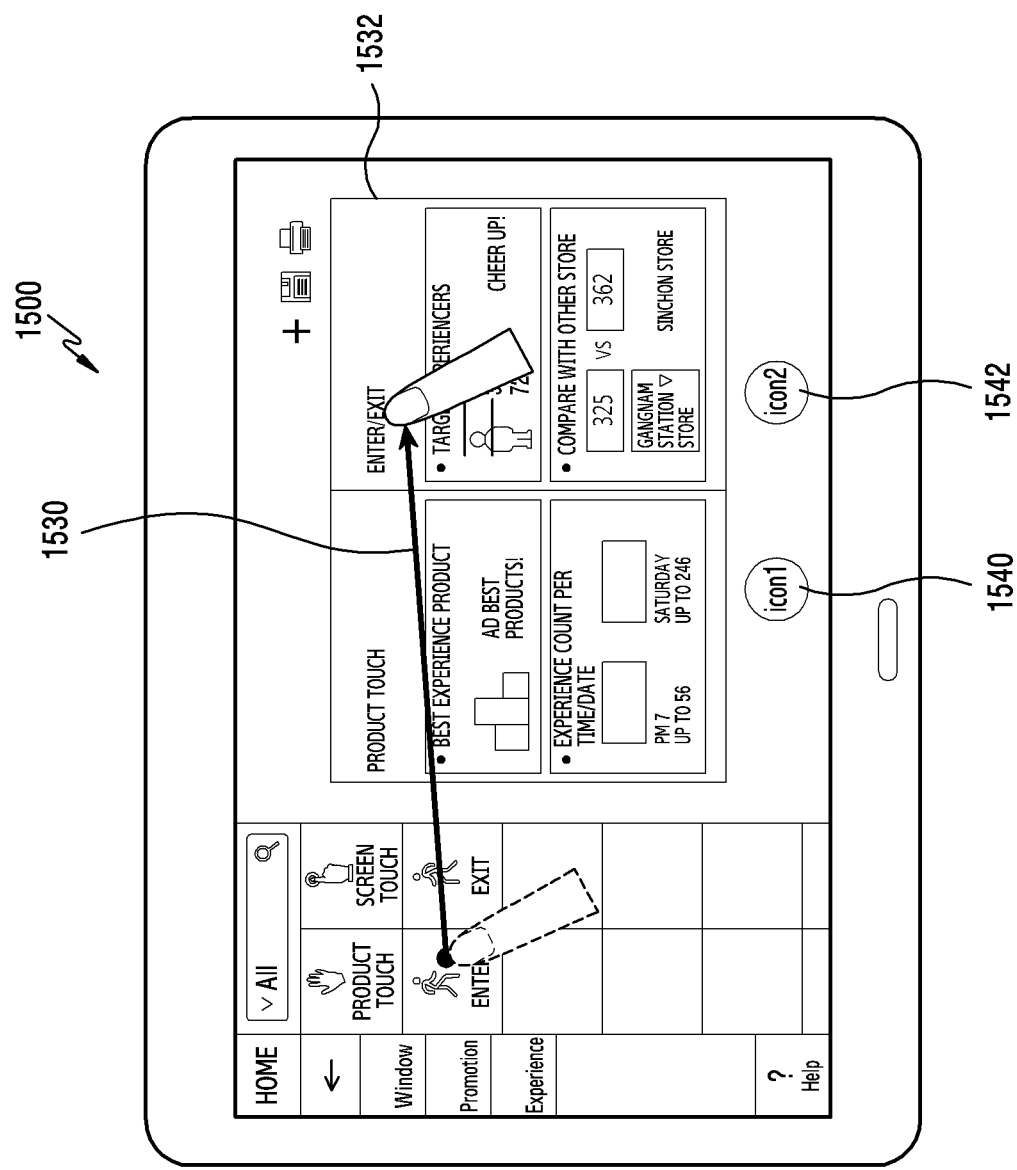
Figure 15C:
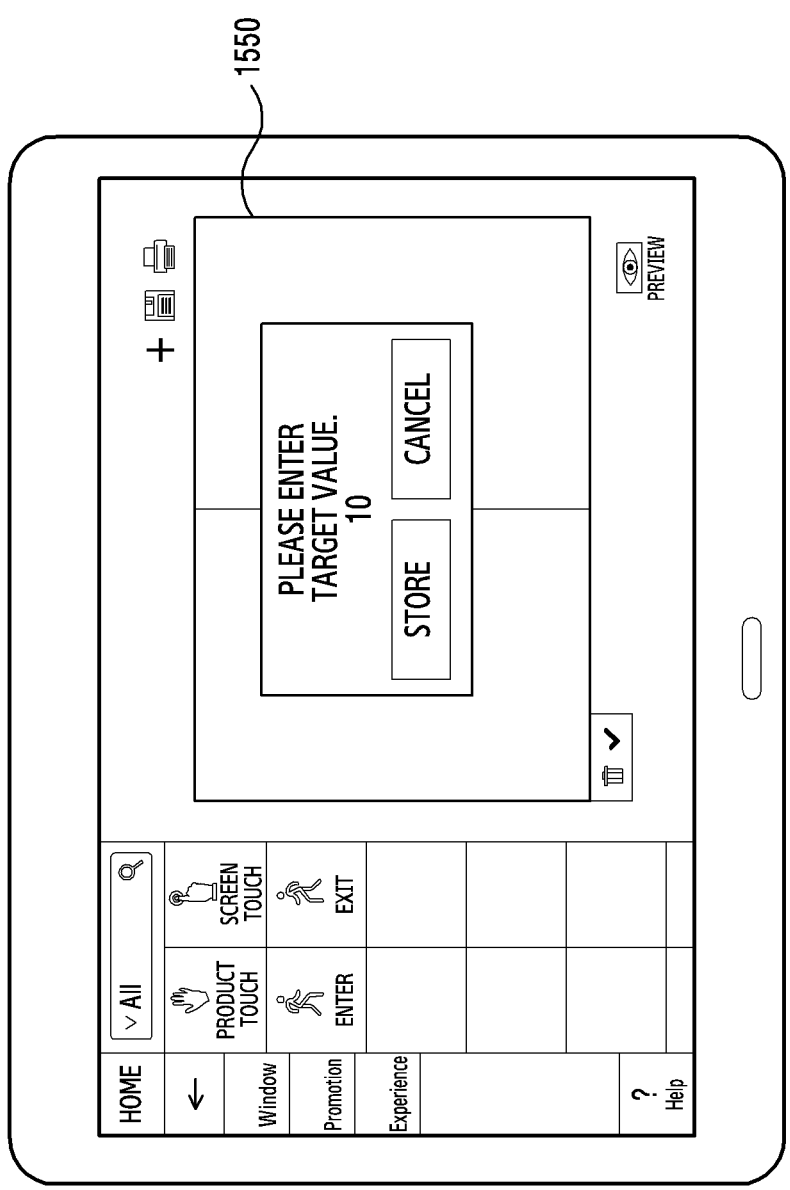

If detecting the occurrence of the event for providing the statistics information, the electronic device may display a statistics screen of the interaction included in the reactive content driven at the external electronic device, on the display in operation 1405. For example, if detecting the occurrence of the event for providing the statistics information, the processor 220 may control the display 260 to display a statistics screen 1500, as shown in FIG. 15A. For example, the statistics screen 1500 may include a display area 1510 for displaying the statistics information and an interaction list 1520 included in the reactive content. If a corresponding icon enters the display area 1510 through a drag input 1530 of an icon "enter" in the interaction list 1520, as shown in FIG. 15B, the processor 220 may display statistics information 1532 of the interaction "enter" in at least part of the display area 1510. For example, the processor 220 may display the statistics information 1532 of the interaction "enter" in at least part of the display area 1510 corresponding to a point where the drag input 1530 of the icon "enter" is released. Additionally or alternatively, if detecting a selection input of a target setting menu (e.g., a second icon 1542), as shown in FIG. 15C, the processor 220 may display a target setting window 1550 of a specific interaction (e.g., the interaction "enter) in at least partial area of the display 260. The processor 220 may set a statistical target for the specific interaction with an input for the target setting window 1550.

The electronic device may identify whether occurrence of an event for configuring content is detected in operation 1407. For example, the processor 220 may identify whether a touch input of a content configuration menu (e.g., a first icon 1541) is detected, in the statistics screen 1500 of FIG. 15B.

Figure 15D:
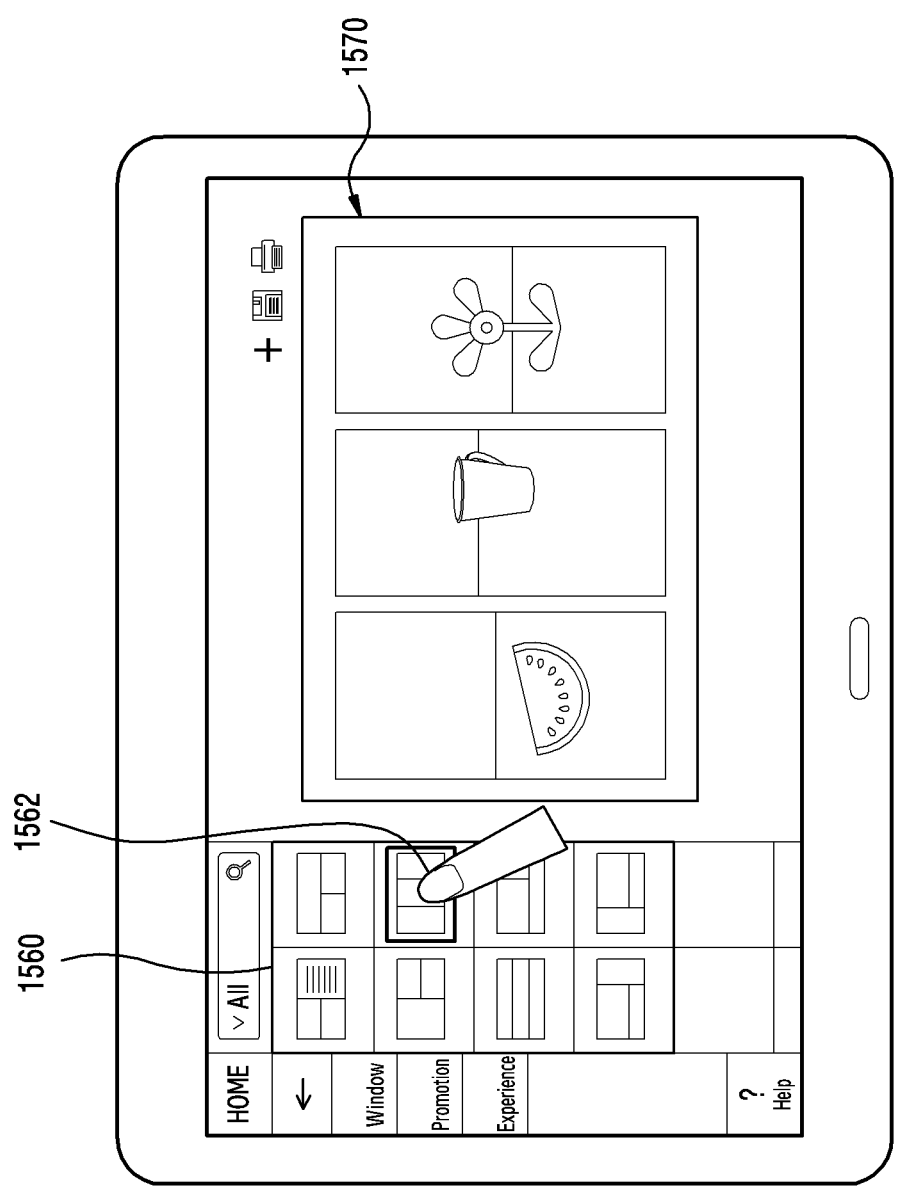

If detecting the occurrence of the event for configuring the content, the electronic device may configure content including the statistics information in operation 1409. For example, the processor 220 may detect statistics information of an interaction "product touch" for configuring the content among statistics information of at least one interaction displayed in the display 260. The processor 220 may extract at least one product information based on descending order of a product touch count among the statistics information of the interaction "product touch". The processor 220 may configure content including at least one product information extracted based on the product touch count. Additionally or alternatively, the processor 220 may display a layout list 1560 for configuring the content in at least partial area of the display 260, as shown in FIG. 15D. If detecting a selection input of a first layout 1562 in the layout list 1560, the processor 220 may configure content 1570 including at least one product information extracted based on the product touch count in a structure of the first layout 1562.

Figure 15E:
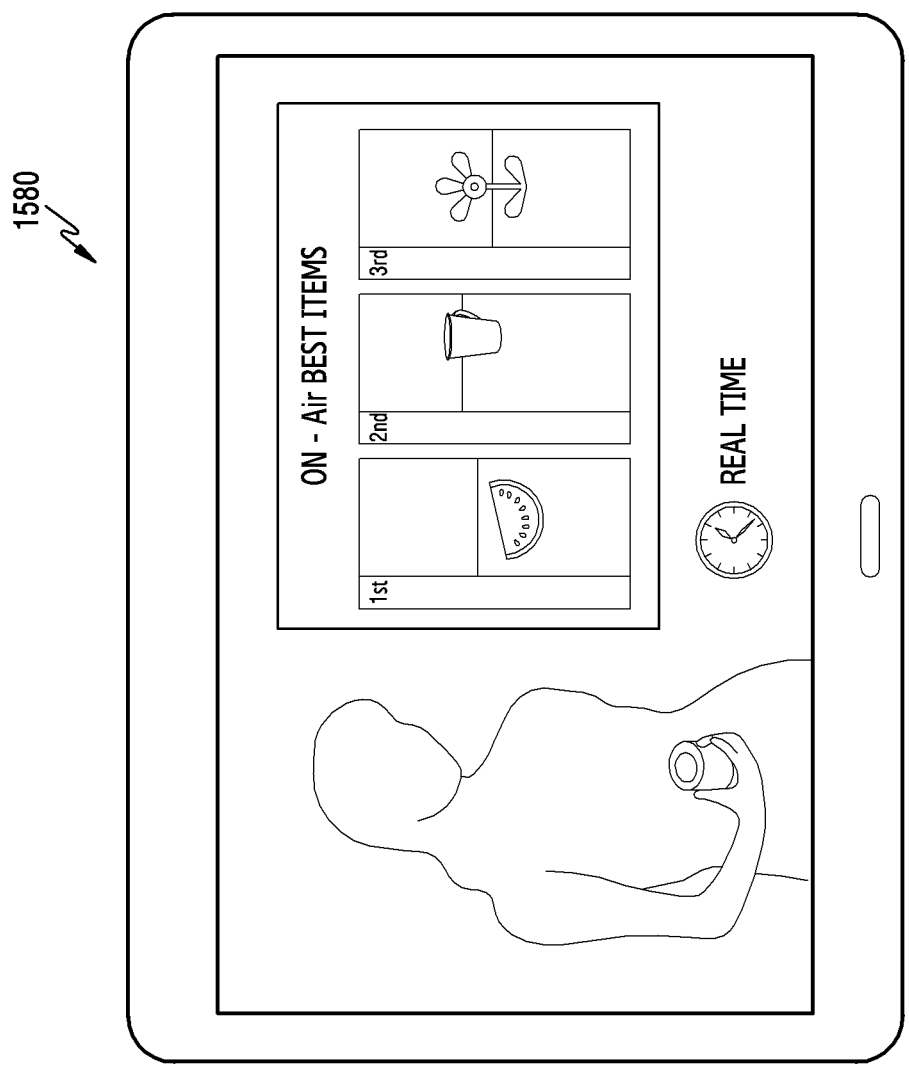

The electronic device may transmit content configuration information including the statistics information to an external electronic device in operation 1411. In this case, the external electronic device may display content 1580 including the statistics information provided from the electronic device in a display, as shown in FIG. 15E.

According to various embodiments of the present invention, the electronic device may update the product information which configures the content including the statistics information based on the interaction information of the reactive content collected from the external electronic device. For example, the electronic device may update the product information which configures the content including the statistics information on a periodic basis or in real time.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations.

At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element.

Operations carried out by the module, the program module or the another constituent element according to various embodiments may be executed in a sequential, parallel, repeated or heuristic manner, or at least some operations may be executed in different order or be omitted, or another operation may be added.

The embodiments disclosed herein are proposed to help with description and comprehension of disclosed technical contents, and do not limit the scope of various embodiments of the present disclosure. Therefore, the scope of the various embodiments of the present disclosure should be construed as including all modifications or various other embodiments based on the spirit and scope of the various embodiments of the present disclosure.

The invention claimed is:

1. An electronic device comprising:
a communication interface;
a display; and
at least one processor configured to:
control the display to display an image including at least one item received from an external electronic device through the communication interface,
correct the image into a top view form,
control the display to display a lattice pattern form to overlap the image which is corrected into the top view form,
select at least one lattice cell included in the lattice pattern,
apply spatial coordinates for the selected lattice cell,
set the selected lattice cell to which the spatial coordinates are applied as an area for an interaction of a sensor of the external electronic device, and
map content associated with the at least one item to the area for the interaction.

2. The electronic device of claim 1, wherein the external electronic device comprises a-digital signage, and
the sensor of the external electronic device comprises a three-dimensional camera.

3. The electronic device of claim 1, wherein the at least one processor is configured to:
select any one interaction from an interaction list contained in reactive content transmitted to the external electronic device through the communication interface, and
set an area for the selected interaction of the sensor of the external electronic device.

4. The electronic device of claim 3, wherein the at least one processor is configured to map content mapped to the selected interaction, to the area for the interaction.

5. The electronic device of claim 1, wherein the at least one processor is configured to:
identify setting information of a space setting menu displayed in the at least one lattice cell included in the lattice pattern,
calculate spatial coordinates for the at least one lattice cell included in the lattice pattern based on the setting information of the space setting menu, and
set the area for the interaction of the sensor of the external electronic device by applying the spatial coordinates to the at least one lattice cell included in the lattice pattern.

6. The electronic device of claim 1, wherein the at least one processor is configured to:
copy at least one partial area which is preset,
set a copy point based on user information, and
set an additional area corresponding to the at least one preset partial area at the copy point.

7. The electronic device of claim 1, wherein the at least one processor is configured to:
configure reactive content comprising at least one interaction to be provided from the external electronic device,
control the communication interface to transmit information of the reactive content to the external electronic device, obtain an image from the external electronic device to which the reactive content is transmitted through the communication interface, and control the display to display the image obtained from the external electronic device.

8. The electronic device of claim 7, wherein the at least one processor is configured to control the communication interface to transmit at least one of at least one interaction information contained in the reactive content and scheduling information of the reactive content to the external electronic device.

9. The electronic device of claim 1, wherein the at least one processor is configured to:

collect interaction execution information from the external electronic device, select at least one interaction based on a user input, and control the display to display statistics information of the at least one selected interaction based on the interaction execution information.

10. The electronic device of claim 9, wherein the at least one processor is configured to:

configure content comprising at least part of the statistics information for the interaction execution information, and control the communication interface to transmit the content to the external electronic device.

11. An operating method of an electronic device, comprising:

displaying an image including at least one item obtained from an external electronic device;

correcting the image into a top view form;

displaying a lattice pattern form to overlap the image which is corrected into the top view form;

selecting at least one lattice cell included in the lattice pattern;

applying, spatial coordinates for the selected lattice cell;

setting the selected lattice cell to which the spatial coordinates are applied as an area for an interaction of a sensor of the external electronic device; and mapping content to the area for the interaction.

12. The operating method of claim 11, further comprising:

selecting any one interaction from an interaction list contained in reactive content transmitted to the external electronic device, wherein correcting the image into the top view form comprises:

correcting the image obtained from the external electronic device into the top view form in response to selecting the reactive content.

13. The operating method of claim 12, wherein mapping the content comprises:

mapping content mapped to the interaction selected from the interaction list contained in the reactive content, to the area for the interaction.

14. The operating method of claim 11, wherein mapping the content comprises:

selecting any one interaction from the interaction list contained in the reactive content transmitted to the external electronic device;

identifying content corresponding to the selected interaction; and mapping the content to the area for the interaction.

15. The operating method of claim 11, further comprising:

identifying setting information of a space setting menu displayed in the at least one lattice cell included in the lattice pattern;

calculating spatial coordinates for the at least one lattice cell included in the lattice pattern based on the setting information of the space setting menu; and setting the area for the interaction of the sensor of the external electronic device by applying the spatial coordinates to the at least one lattice cell included in the lattice pattern.

16. The operating method of claim 11, further comprising:

copying at least one partial area which is preset, setting a copy point based on user information, and setting an additional area corresponding to the at least one preset partial area at the copy point.

17. The operating method of claim 11, further comprising:

configuring reactive content comprising at least one interaction to be provided from the external electronic device, and transmitting information of the reactive content to the external electronic device, wherein displaying the image comprises displaying the image obtained from the external electronic device.

18. The operating method of claim 17, wherein transmitting information of the reactive content to the external electronic device comprises transmitting at least one of at least one interaction information contained in the reactive content and scheduling information of the reactive content to the external electronic device.

19. The operating method of claim 11, further comprising:

collecting interaction execution information from the external electronic device, selecting at least one interaction based on a user input, and displaying statistics information of the at least one selected interaction based on the interaction execution information.

20. The operating method of claim 19, further comprising:

configuring content comprising at least part of the statistics information for the interaction execution information, and transmitting the content to the external electronic device.

* * * * *